US00RE41552E

(19) United States
(12) Reissued Patent
Li et al.

(10) Patent Number: US RE41,552 E
(45) Date of Reissued Patent: Aug. 24, 2010

(54) COMPOSITION FOR THE PRODUCTION OF IMPROVED PULP

(75) Inventors: Wei Li, Nekossa, WI (US); Ulrike Waltraud Tschirner, Arden Hill, MN (US); Sheldon Phillip Verrett, St. Louis, MO (US); Jacob Owen Thompson, Minneapolis, MN (US)

(73) Assignee: Thermphos Trading GmbH, Zug (CH)

(21) Appl. No.: 11/801,426

(22) Filed: May 9, 2007

Related U.S. Patent Documents

Reissue of:
(64) Patent No.: 6,890,404
Issued: May 10, 2005
Appl. No.: 10/163,244
Filed: Jun. 5, 2002

U.S. Applications:
(60) Provisional application No. 60/296,296, filed on Jun. 6, 2001, and provisional application No. 60/302,487, filed on Jul. 2, 2001.

(51) Int. Cl.
*D21C 9/00* (2006.01)
*D21C 11/00* (2006.01)
*C02F 5/14* (2006.01)

(52) U.S. Cl. ..... 162/80; 162/29; 162/30.11; 162/48; 252/175; 252/181

(58) Field of Classification Search ..... 162/29, 162/31–32, 38, 48, 70, 72, 76, 80; 252/175, 252/180–181; 210/700
See application file for complete search history.

(56) References Cited

U.S. PATENT DOCUMENTS

| | | | |
|---|---|---|---|
| 3,448,003 | A | 6/1969 | Merriman |
| 3,979,385 | A | 9/1976 | Wollmann et al. |
| 4,006,182 | A | 2/1977 | Ploger et al. |
| 4,631,131 | A | 12/1986 | Cuisia et al. |
| 4,735,787 | A | 4/1988 | Mouche et al. |
| 4,799,995 | A | 1/1989 | Crump et al. |
| 4,851,082 | A | 7/1989 | Mita et al. |
| 4,851,490 | A | 7/1989 | Chen et al. |
| 4,872,996 | A | 10/1989 | Grierson et al. |
| 4,919,845 | A | 4/1990 | Vogt et al. |
| 5,002,126 | A | 3/1991 | Carlberg et al. |
| 5,087,376 | A | 2/1992 | Bendiksen et al. |
| 5,094,304 | A | 3/1992 | Briggs |
| 5,221,487 | A | 6/1993 | Carter |
| 5,261,491 | A | 11/1993 | Stewart et al. |
| 5,306,392 | A | 4/1994 | Mita |
| 5,320,757 | A | 6/1994 | Zidovec et al. |
| 5,441,602 | A | 8/1995 | Harris et al. |
| 5,490,942 | A | 2/1996 | Kuczynski |
| 5,534,157 | A | 7/1996 | Iman et al. |
| 5,552,018 | A | 9/1996 | Devenyns |
| 5,560,862 | A | 10/1996 | Gosselink et al. |
| 5,562,830 | A | 10/1996 | Zidovec et al. |
| 5,635,104 | A | 6/1997 | Kott et al. |
| 5,788,857 | A | 8/1998 | Yang et al. |
| 6,210,600 | B1 | 4/2001 | Zhou et al. |
| 6,572,789 | B1 | 6/2003 | Yang et al. |
| 2002/0094299 | A1 | 7/2002 | Nguyen et al. |
| 2003/0010458 | A1 | 1/2003 | Thompson et al. |

FOREIGN PATENT DOCUMENTS

| | | | |
|---|---|---|---|
| CA | 1069800 | * | 1/1980 |
| DE | 3537808 | * | 4/1987 |
| DE | 19857251 | * | 6/2000 |
| WO | WO 200298803 | * | 12/2002 |

OTHER PUBLICATIONS

Windhager, R.H.; An Effective Sequestrant for Use in Controlling Digester Scale; Paper Trade Journal, pp. 42–44 (Nov. 5, 1973).*

* cited by examiner

*Primary Examiner*—José A Fortuna
(74) *Attorney, Agent, or Firm*—Husch Blackwell Sanders LLP

(57) ABSTRACT

Compositions and method for improving properties of pulp produced or reducing the digester cycle time in alkaline chemical pulping processes in which an effective amount of at least one selected phosphonate or carboxylate compound or mixtures thereof is admixed with the alkaline aqueous mixture in the digester of the chemical pulping process. The compositions and method are especially well suited for use in the Kraft pulping process.

40 Claims, No Drawings

COMPOSITION FOR THE PRODUCTION OF IMPROVED PULP

Matter enclosed in heavy brackets [ ] appears in the original patent but forms no part of this reissue specification; matter printed in italics indicates the additions made by reissue.

CROSS-REFERENCE TO RELATED APPLICATIONS

This application is a nonprovisional application which claims the priority of prior provisional applications Ser. No. 60/296,296, entitled "Method for the Production of Improved Pulp," filed Jun. 6, 2001, and Ser. No. 60/302,487, entitled "Method for the Production of Improved Pulp," filed Jul. 2, 2001, both of which are hereby incorporated by reference into this application.

BACKGROUND OF THE INVENTION

This invention relates to compositions and methods for the production of enhanced pulp in chemical pulping processes. More particularly, this invention relates to compositions and methods for producing enhanced pulp in the Kraft pulp process. This invention further relates to compositions and methods for improving the pulp production rate in chemical pulping processes.

Worldwide, pulp making is carried out on a large scale. Accordingly, it is highly desirable that such pulp making operations be carried out in a cost effective, efficient operation with minimum equipment downtime and with minimum periods of reduced process equipment operating efficiency. It is further desired to produce wood pulp of high strength, quality and high yield.

The basic steps in industrial pulp making are to convert plant fiber into chips, convert chips into pulp, (optionally) bleach the pulp, wash the pulp, and transform the pulp into suitable paper which can be used in paper products such as writing paper, newsprint and paper for documents.

Typically, several chemical pulping processes are used in industrial pulp making operations. Well known industrial alkaline chemical pulping processes include the Kraft (or sulfate), soda and alkaline sulfite processes. The Kraft process makes the strongest fibers of any pulp making process and is the most commonly used pulp making process in part due to its efficient recovery process for the cooking chemicals. Nevertheless some degree of degradation of the cellulose fibers occurs under conditions of the Kraft cook leading to shorter fibers and higher amounts of dissolved cellulose.

While the present invention has applicability to any of the above alkaline chemical pulping processes, it is particularly useful with the Kraft process and, as such, the Kraft process is described in more detail below.

Initially, suitable trees are harvested, debarked and then chipped into suitable size flakes or chips. These wood chips are sorted with the small and the large chips being removed. The remaining suitable wood chips are then charged to a digester (which is a vessel or tank for holding the chips and an aqueous digesting composition and which can be operated in either a batch or continuous mode as desired).

Illustratively, in a batch type digester, wood chips and a mixture of "weak black liquor," the spent liquor from a previous digester cook, and "white liquor," a solution of sodium hydroxide and sodium sulfide, that is either fresh or from the chemical recovery plant, is pumped into the digester. In the cooking process, lignin, which binds the wood fiber together, is dissolved in the white liquor forming pulp and black liquor.

The digester is sealed and the digester composition is heated to a suitable cook temperature, e.g. temperatures up to about 180° C., under high pressure. After an allotted cooking time at a particular temperature and pressure (H-factor) in the digester, the digester contents (pulp and black liquor) are transferred to a holding tank. The pulp in the holding tank is transferred to the brown stock washers while the liquid (black liquor formed in the digester) is sent to the black liquor recovery area. The black liquor is evaporated to a high solids content, usually 60–80% solids. Most commercial paper mills use multiple effect evaporators (MEE) as the black liquor evaporators. These evaporators generally range from four to eight effects in length.

The Kraft cook is highly alkaline, usually having a pH of 10 to 14, more particularly 12 to 14. The digester composition contains a large amount of sodium sulfide, which is used as an accelerant to increase the delignification rate of the cook. This works to release most of the lignin in the wood chips and thus the cellulose and part of the hemicellulose become available as pulp.

In practice, the pulping process and subsequent bleaching processes are separate operations. There are several bleaching sequences that are used commercially. Chlorine, chlorine dioxide, sodium hypochlorite, hydrogen peroxide, oxygen, ozone and mixtures thereof are employed in many bleaching processes. In one typical bleaching process, pulp recovered from the digester process is treated with the following steps: (a) chlorine dioxide, (b) caustic extraction, (c) chlorine dioxide, (d) caustic extraction, and (e) chlorine dioxide to reach the final pulp brightness. It is highly desirable to generate pulps, including Kraft pulps, with lower overall lignin content as these pulps require less bleaching chemical and thus generate less pollutant, especially absorbable organic halide (AOX) levels.

One approach to generate Kraft pulps with low lignin content is by using an extended delignification process. Extended delignification processes require extensive equipment changes (additional cooking vessels) and may result in higher facility energy requirements. Additionally, a major concern with extended delignification is to achieve decreased lignin content while minimizing cellulose damage. Cellulose damage is reflected in lower pulp viscosity and lower pulp strength.

Thus, preparation of pulp having decreased lignin content, i.e. lower Kappa number, with lower bleaching chemical requirements in the overall pulping operation is highly desired. Furthermore, preparation of pulp having improved strength properties is also highly desired. In addition, obtaining higher yields in the pulping process is highly desired as this could increase production and/or lower pulp production costs. Alternatively, preparation of pulp at an accelerated rate, e.g. reducing the digester cycle time in a batch digester, is desired even if the pulp properties remained constant. Compositions for use in chemical pulping processes and an improved chemical pulping process that can achieve one or more of the above improvements would be extremely valuable to the industry.

Compositions for use in chemical pulping processes and an improved chemical pulping process have now been discovered that achieve one or more of the desired pulp property or process throughput improvements.

SUMMARY OF THE INVENTION

It is an object of the invention to provide an improved chemical pulping process for the production of wood pulps. It is another object of this invention to provide an improved chemical pulping process for achieving increased lignin removal during the digester cycle for preparing pulp with improved physical properties. It is yet another object of the invention to reduce the amount of pulping chemicals required during the digester cook. It is yet another object of the invention to reduce the amount of chemicals required during bleaching of digested pulp to achieve bleached pulp of the desired brightness, etc. It is yet another object of this invention to provide an improved chemical pulping process that increases the pulp production rate while producing pulp with the required physical properties. It is yet another object of the invention to obtain higher yields in the pulping process. One or more of these objects as well as other objects are achieved in the invention which is described hereinafter in more non-limiting detail.

According to the invention, an aqueous composition for improving properties of pulp produced, reducing the digester cycle time, or reducing the pulping or bleaching chemicals required in alkaline chemical pulping processes is provided wherein the composition is added to the digester of the chemical pulping process, the composition comprising an effective amount of at least one compound selected from phosphonates having the formula:

$$X_2NCH_2PO_3M_2 \quad \text{(I)},$$

phosphonates having the formula:

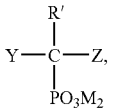

(II)

compounds having the formula:

$$(MOOC—CH_2)_2—N(CH_2)_2—N(CH_2COOM)—(CH_2)_2N—(CH_2COOM)_2 \quad \text{(III)},$$

phosphonates having the formula:

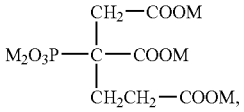

(IV)

amine oxides of the phosphonates of formula (I), or mixtures thereof; wherein M is independently selected from hydrogen, alkali metal, alkaline earth metal or ammonium, X is independently selected from H, R, —$CH_2PO_3M_2$ wherein R is an alkyl group or —$NX_2$ substituted alkyl group having 2 to 6 carbon atoms, R' is an alkyl group having 1 to 17 carbon atoms and R' is optionally branched, optionally unsaturated, and optionally substituted with —$SO_3M$, Y is selected from —$PO_3M_2$, H or R', and Z is selected from —OH or —$NR_1R_2$ wherein $R_1$ and $R_2$ are independently selected from hydrogen or alkyl having 1 to 2 carbon atoms.

Further according to the invention, a method for improving properties of pulp produced or reducing the digester cycle time in alkaline chemical pulping processes is provided comprising adding an effective amount of at least one compound to the alkaline aqueous mixture in the digester of the chemical pulping process, wherein the at least one compound is as described above.

DETAILED DESCRIPTION OF THE DRAWINGS

NOT APPLICABLE.

DETAILED DESCRIPTION OF THE INVENTION

The wood chips that can be processed into pulp using the composition and chemical pulping process of the invention can be either hardwoods, softwoods or mixtures thereof. Suitable hardwoods include, but are not limited to, aspen, birch, cottonwood, poplar, maple, and the like, and mixtures thereof. Suitable softwoods include, but are not limited to, pine (e.g. red pine, jack pine, and Southern yellow pine), spruce, balsam fir, Douglas fir, and the like, and mixtures thereof.

A first embodiment of the invention relates to an aqueous composition for improving properties of pulp produced, reducing the digester cycle time, or reducing the pulping or bleaching chemicals required in alkaline chemical pulping processes wherein the composition is added to the digester of the chemical pulping process, the composition comprising an effective amount of at least one compound selected from phosphonates having the formula:

$$X_2NCH_2PO_3M_2 \quad \text{(I)},$$

phosphonates having the formula:

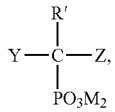

(II)

compounds having the formula:

$$(MOOC—CH_2)_2—N(CH_2)_2—N(CH_2COOM)—(CH_2)_2N—(CH_2COOM)_2 \quad \text{(III)},$$

phosphonates having the formula:

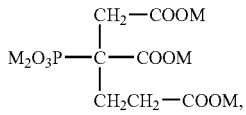

(IV)

amine oxides of the phosphonates of formula (I), or mixtures thereof; wherein M is independently selected from hydrogen, alkali metal, alkaline earth metal or ammonium, X is independently selected from H, R, —$CH_2PO_3M_2$ wherein R is an alkyl group or —$NX_2$ substituted alkyl group having 2 to 6 carbon atoms, R' is an alkyl group having 1 to 17 carbon atoms, preferably 1 to 11 carbon atoms, more preferably 1 to 5 carbon atoms, and most preferably methyl, and R' is optionally branched, optionally unsaturated, and optionally substituted with —$SO_3M$, Y is selected from —$PO_3M_2$, H or R', and Z is selected from —OH or —$NR_1R_2$ wherein $R_1$ and $R_2$ are independently selected from hydrogen or alkyl having 1 to 2 carbon atoms.

In the phosphonates of the invention, M is preferably hydrogen or alkali metal, and the alkali metal is preferably sodium or potassium, X is preferably R or —$CH_2PO_3M_2$, Y is preferably —$PO_3M_2$, and R' is preferably an alkyl group having 1 to 11 carbon atoms, more preferably 1 to 5 carbon atoms, and most preferably methyl.

Examples of suitable phosphonates include, but are not limited to, the phosphonates in Table 1 below. Table 1 below provides formulas for representative phosphonates of formulas (I) and (II). The phosphonates in Table 1 are available from Solutia Inc., 575 Maryville Centre Drive, St. Louis, Mo. under the trademark Dequest® phosphonates and are identified by their Dequest® phosphonate product number. The preferred compound of formula (III) is diethylenetriamine pentaacetic acid (DTPA), or salts thereof.

Phosphonates of formula (II) wherein R' is substituted with —$SO_3M$ can be prepared according to the procedures in German patent publication DE 198 57 251 A1 (Jun. 15, 2000) and U.S. Pat. No. 5,221,487, which are herein incorporated by reference. Suitable sulfonated phosphonates of formula (II) include, but are not limited to, 1-hydroxy-3-sulfonopropan-1,1-diphosphonic acid, 2-sulfo-1-hydroxyethylidene-1,1-diphosphonic acid, 2-sulfo-1-aminoethylidene-1,1-diphosphonic acid, and salts thereof.

Phosphonates of formula (II) wherein Z is $—NR_1R_2$ can be prepared according to the procedures in U.S. Pat. No. 3,979,385 and U.S. Pat. No. 4,006,182, which are herein incorporated by reference. Suitable phosphonates of formula (II) wherein Z is $—NR_1R_2$ include, but are not limited to, 1-aminoethylidene-1,1-disphosphonic acid and salts thereof.

TABLE 1

| Dequest Product No. | Formula | X (or Y) | R (or R') | N | X' (or Z) | M |
|---|---|---|---|---|---|---|
| 2000 | I | 2 $—CH_2PO3M_2$ | — | — | — | 6 H |
| 2006 | I | 2 $—CH_2PO3M_2$ | — | — | — | 5 Na, 1 H |
| 2010 | II | $—PO_3M_2$ | $—CH_3$ | — | —OH | 4 H |
| 2016 | II | $—PO_3M_2$ | $—CH_3$ | — | —OH | 4 Na |
| 2041 | I | 1R, 1 $—CH_2PO_3M_2$ | $—(CH_2)mNX'_2$ | 2 | 2-$CH_2PO_3M_2$ | 8 H |
| 2046 | I | 1R, 1 $—CH_2PO_3M_2$ | $—(CH_2)mNX'_2$ | 2 | 2-$CH_2PO_3M_2$ | 5 Na, 3 H |
| 2054 | I | 1R, 1 $—CH_2PO_3M_2$ | $—(CH_2)mNX'_2$ | 6 | 2-$CH_2PO_3M_2$ | 6 K, 2 H |
| 2060 | I | 2R | $—(CH_2)mNX'_2$ | 2, 2 | 4-$CH_2PO_3M_2$ | 10 H |
| 2066 | I | 2R | $—(CH_2)mNX'_2$ | 2, 2 | 4-$CH_2PO_3M_2$ | 7 Na, 3 H |
| 6004 | Amine oxide of I | 2 $—CH_2PO_3M_2$ | — | — | — | 5 K, 1 H |
| 7000 | IV | — | — | — | — | 5 H |
| 2090 | I | 2R | $—(CH_2)mNX'_2$ | 6, 6 | 4-$CH_2PO_3M_2$ | 10 H |

The formulas and corresponding names of the Dequest phosphonates listed in Table 1 are shown below.

Dequest 2000—amino-tri(methylenephosphonic acid)

$$N(CH_2PO_3H_2)_3$$

Dequest 2006—sodium salt of amino-tri (methylenephosphonic acid)

$$Na_5H[N(CH_2PO_3)_3]$$

Dequest 2010—1-hydroxyethylidene (1,1-diphosphonic acid)

$$CH_3C(OH)(PO_3H_2)_2$$

Dequest 2016—sodium salt of 1-hydroxyethylidene (1,1-diphosphonic acid)

$$Na_4[CH_3C(OH)(PO_3)_2]$$

Dequest 2041—ethylenediamine tetra (methylenephosphonic acid)

$$H_8[(O_3PCH_2)_2NCH_2CH_2N(CH_2PO_3)_2]$$

Dequest 2046—ethylenediamine tetra (methylenephosphonic acid), pentasodium salt $$Na_5H_3[(O_3PCH_2)_2NCH_2CH_2N(CH_2PO_3)_2]$$

Dequest 2054—hexamethylenediamine tetra (methylenephosphonic acid), hexapotassium salt $$K_6H_2[(O_3PCH_2)_2N(CH_2)_6N(CH_2PO_3)_2]$$

Dequest 2060—diethylenetriamine-penta (methylenephosphonic acid)

$$(H_2O_3PCH_2)_2NCH_2CH_2N(CH_2PO_3H_2)CH_2CH_2N(CH_2PO_3H_2)_2$$

Dequest 2066—sodium salt of diethylenetriamine-penta (methylenephosphonic acid)

$$Na_7H_3[(O_3PCH_2)_2NCH_2CH_2N(CH_2PO_3)CH_2CH_2N(CH_2PO_3)_2]$$

Dequest 6004—nitrilotris(methylene)triphosphonic acid N-oxide, potassium salt $$^{-}O\leftarrow{}^{+}N—(CH_2PO_3K_2)_3$$

Dequest 7000—2-phosphonobutane-1,2,4-tricarboxylic acid $$\begin{array}{l} \qquad\quad CH_2—COOH \\ \qquad\quad\ \ | \\ H_2O_3P—C(COOH)—CH_2CH_2—COOH \end{array}$$

Dequest 2090—di(hexamethylene)triamine-penta (methylenephosphonic acid) or sodium salt thereof $$(H_2O_3PCH_2)_2N(CH_2)_6N(CH_2PO_3H_2)(CH_2)_6N(CH_2PO_3H_2)_2$$

Another preferred phosphonate of formula (I) is the compound N,N'-bis(3-aminopropyl)ethylenediamine-hexa (methylenephosphonic acid), or a salt thereof wherein the salt is sodium, potassium, ammonium and the like. When the compound is the sodium salt, the compound has the formula $$Na_xH_y[(O_3PCH_2)_2NCH_2CH_2CH_2N(CH_2PO_3)CH_2CH_2N(CH_2PO_3)CH_2CH_2CH_2N(CH_2PO_3)_2];$$

wherein x+y is 12, and is designated herein as 4NHMP. This compound can be prepared according to the procedure in Example 1 of U.S. Pat. No. 5,261,491, which is herein incorporated by reference.

One preferred phosphonate of formula (I) is a phosphonate wherein at least one of X is R and R is $—(CH_2)_nNX'_2$, wherein n is an integer from 2 to 6, preferably 2 to 4, and X' is independently selected from R or $—CH_2PO_3M_2$. Another preferred phosphonate of formula (I) is a phosphonate wherein each X is R and R is $—(CH_2)_nNX'_2$, wherein n is an integer from 2 to 6, preferably 2 to 4, and X' is independently selected from R or $—CH_2PO_3M_2$. Another preferred phosphonate of formula I is a phosphonate wherein each X is $—CH_2PO_3M_2$.

A preferred phosphonate of formula (II) is a phosphonate wherein Y is $—PO_3M_2$ and R' is alkyl of 1 to 11 carbons, more preferably 1 to 5 carbon atoms. A more preferred phosphonate of formula (II) is a phosphonate wherein Y is $—PO_3M_2$ and R' is methyl.

A preferred amine oxide of the phosphonate of formula (I) is $^{-}O \leftarrow {}^{+}N—(CH_2PO_3K_2)_3$.

The preferred phosphonate of formula (IV) is 2-phosphonobutane-1,2,4-tricarboxylic acid.

The preferred aqueous compositions of the invention and the effective concentration of the phosphonates or polycarboxylates of the invention will depend on many factors including, but not limited to, the type of wood, the pulping conditions in the digester, whether the pulp is to be bleached or not, and the desired pulp properties.

In the aspect of the invention where an aqueous composition is added to the digester of the chemical pulping process for improving properties of pulp produced in alkaline chemical pulping processes, the composition comprises an effective property improving amount of at least one compound described above.

In another aspect of the invention where an aqueous composition is added to the digester of the chemical pulping process for reducing the digester cycle time in alkaline chemical pulping processes, the composition comprises an amount of at least one compound described above effective to permit reduction of the cycle time and production of pulp with comparable physical properties.

When the pulp is produced from hardwood wood chips, the currently preferred phosphonates of the invention are as follows:

$CH_3C(OH)(PO_3M_2)_2$,
$(M_2O_3PCH_2)_2N(CH_2)_3N(CH_2PO_3M_2)(CH_2)_2N(CH_2PO_3M_2)(CH_2)_3N(CH_2PO_3M_2)_2$,
$(M_2O_3PCH_2)_2NCH_2CH_2N(CH_2PO_3M_2)CH_2CH_2N(CH_2PO_3M_2)_2$, $N(CH_2PO_3M_2)_3$,
$^{-}O \leftarrow {}^{+}N—(CH_2PO_3M_2)_3$,
$(M_2O_3PCH_2)_2NCH_2CH_2N(CH_2PO_3M_2)_2$,
$(M_2O_3PCH_2)_2N(CH_2)_6N(CH_2PO_3M_2)_2$, and

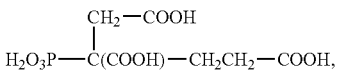

more preferably $CH_3C(OH)(PO_3M_2)_2$,
$(M_2O_3PCH_2)_2N(CH_2)_3N(CH_2PO_3M_2)(CH_2)_2N(CH_2PO_3M_2)(CH_2)_3N(CH_2PO_3M_2)_2$,
$(M_2O_3PCH_2)_2NCH_2CH_2N(CH_2PO_3M_2)CH_2CH_2N(CH_2PO_3M_2)_2$,
$N(CH_2PO_3M_2)_3$,
$^{-}O \leftarrow {}^{+}N—(CH_2PO_3M_2)_3$, and
$(M_2O_3PCH_2)_2NCH_2CH_2N(CH_2PO_3M_2)_2$, and
most preferably $CH_3C(OH)(PO_3M_2)_2$, and
$(M_2O_3PCH_2)_2N(CH_2)_3N(CH_2PO_3M_2)(CH_2)_2N(CH_2PO_3M_2)(CH_2)_3N(CH_2PO_3M_2)_2$.

When the pulp is produced from softwood wood chips, the currently preferred phosphonates of the invention are as follows:

$N(CH_2PO_3M_2)_3$,
$(M_2O_3PCH_2)_2N(CH_2)_3N(CH_2PO_3M_2)(CH_2)_2N(CH_2PO_3M_2)(CH_2)_3N(CH_2PO_3M_2)_2$,
$CH_3C(OH)(PO_3M_2)_2$,
$^{-}O \leftarrow {}^{+}N—(CH_2PO_3M_2)_3$,

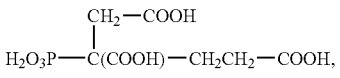

$(M_2O_3PCH_2)_2N(CH_2)_6N(CH_2PO_3M_2)_2$, and
$(M_2O_3PCH_2)_2NCH_2CH_2N(CH_2PO_3M_2)CH_2CH_2N(CH_2PO_3M_2)_2$, and
more preferably $N(CH_2PO_3M_2)_3$,
$(M_2O_3PCH_2)_2N(CH_2)_3N(CH_2PO_3M_2)(CH_2)_2N(CH_2PO_3M_2)(CH_2)_3N(CH_2PO_3M_2)_2$, and
$CH_3C(OH)(PO_3M_2)_2$.

Blends of at least two compounds independently selected from the phosphonates of formulas (I), (II) and (IV), the polycarboxylate of formula (III), and the amine oxides of the phosphonates of formula (I) may be used according to the invention. It is currently preferred to use a blend of two phosphonates, with a blend of a phosphonate of formula (I) with either a phosphonate of formula (I) or formula (II) being more preferred, and a blend of a phosphonate of formula (I) with a phosphonate of formula (II) being most preferred. The composition of the blends can vary over a wide range with the percentage of each component ranging broadly from 1 to 99 wt. %, provided each phosphonate is present in an amount of at least about 1 wt. %. Preferably, each phosphonate is present in an amount of at least about 10 wt. %. In the case of a two component blend, each phosphonate is present preferably in an amount of about 10 to about 90 wt. %, and more preferably in an amount of about 20 to about 80 wt. %.

A series of blends of phosphonates which may be used according to the invention were prepared for testing. The blends were prepared as concentrates having 30% total active acid content and were then diluted to the desired concentration for use. These blends (as described below) were tested in a simulated Kraft cook according to the procedure described in the Examples. The weight ratios of these various blends are shown in Table 2 below.

TABLE 2

| BLEND NO.-BLEND OF PHOSPHONATES | BLEND OF PHOSPHONATES | WEIGHT RATIO OF RESPECTIVE PHOSPHONATES IN BLEND |
|---|---|---|
| 78 | D2006/D2066 | 50/50 |
| 79 | D2000/D2054 | 50/50 |
| 80 | D2006/4NHMP | 50/50 |
| 81 | D2010/D2066A | 50/50 |
| 82 | D2010/D2054 | 50/50 |
| 83A | D2016/4NHMP | 70/30[1] |
| 83B | D2016/4NHMP | 25/75[1] |
| 84 | D2054/4NHMP | 50/50 |
| 85 | D2010/D2000 | 50/50 |
| 86 | 4NHMP/D2066A | 50/50 |
| 87 | D2054/D2066A | 50/50 |
| 94 | D2046/D2006 | 50/50 |
| 95 | D2046/D2016 | 60/40 |
| 96 | D2046/D2054 | 60/40 |
| 97 | D2046/D2066A | 50/50 |
| 98 | D2046/4NHMP | 60/40 |

[1]A 50/50 blend concentrate having 30% total active acid content does not remain homogeneous.

The preferred blends for use in the invention are blends of a phosphonate selected from 1-hydroxyethylidene (1,1-diphosphonic acid) or salts thereof with a phosphonate selected from the phosphonates of formulas (I). More preferred are blends of phosphonates selected from 1-hydroxyethylidene (1,1-diphosphonic acid) or salts thereof with amino-tris(methylenephosphonic acid), N,N'-bis(3-aminopropyl)ethylenediamine-hexa (methylenephosphonic acid), hexamethylenediamine tetra (methylenephosphonic acid), diethylenetriamine-penta (methylenephosphonic acid) or salts thereof.

An effective amount of the compositions of the invention, i.e. the phosphonates, carboxylates, or mixtures thereof, is employed in the digester of a chemical pulping process to improve the properties of pulp produced or reduce the digester cycle time in alkaline chemical pulping processes. That effective amount depends on the particular phosphonate(s) employed in practicing this invention and other factors including, but not limited to, wood type, the digester composition, the operating conditions (i.e. H-factor) of the digester, the mode of addition of the compounds of the invention, the composition and operating conditions in the brown stock washing area, and bleaching area, as well as other factors and conditions known to those of ordinary skill in the art. Selection of the effective amount of phosphonate or carboxylate will be readily apparent to one of ordinary skill in the art after reading this specification.

The aqueous compositions of the invention for improving the properties of pulp produced or reducing the digester cycle time in alkaline chemical pulping processes include, but are not limited to, at least one phosphonate of formula (I), at least one phosphonate of formula (II), at least one compound of formula (III), at least one phosphonate of formula (IV), amine oxides of the phosphonates of formula (I), and mixtures of the above. Such mixtures, for example, may comprise a mixture of at least two phosphonates of formula (I), a mixture of at least one phosphonate of formula (I) and at least one phosphonate of formula (II), or a mixture of at least two phosphonates of formula (II). Preferably, the aqueous composition of the invention is at least one phosphonate of formula (I), at least one phosphonate of formula (II), a mixture of at least two phosphonates of formula (I), or a mixture of at least one phosphonate of formula (I) and at least one phosphonate of formula (II).

When the aqueous composition of the invention is at least one phosphonate of formula (I), the phosphonate(s) and the effective amount of each is as follows.

When the phosphonate is $N(CH_2PO_3M_2)_3$, the effective amount of phosphonate on an active acid basis is about 0.05 to about 1 wt. %, preferably about 0.1 to about 0.5 wt. %, based on the weight of wood chips (dry basis) charged to the digester.

When the phosphonate is $(M_2O_3PCH_2)_2NCH_2CH_2N(CH_2PO_3M_2)_2$, the effective amount of the phosphonate on an active acid basis is about 0.03 to about 1 wt. %, preferably about 0.05 to about 0.2 wt. %, based on the weight of wood chips (dry basis) charged to the digester.

When the phosphonate is $(M_2O_3PCH_2)_2N(CH_2)_6N(CH_2PO_3M_2)_2$, the effective amount of the phosphonate on an active acid basis is about 0.03 to about 1 wt. %, preferably about 0.1 to about 0.5 wt. %, based on the weight of wood chips (dry basis) charged to the digester.

When the phosphonate is $(M_2O_3PCH_2)_2NCH_2CH_2N(CH_2PO_3M_2)CH_2CH_2N(CH_2PO_3M_2)_2$, the effective amount of phosphonate on an active acid basis is about 0.03 to about 1 wt. %, preferably about 0.05 to about 0.5 wt. %, based on the weight of wood chips (dry basis) charged to the digester.

When the phosphonate is $(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$, the effective amount of phosphonate on an active acid basis is about 0.03 to about 1 wt. %, preferably about 0.05 to about 0.5 wt. %, based on he weight of wood chips (dry basis) charged to the digester.

When the aqueous composition of the invention is at least one phosphonate of formula (II), the effective amount of phosphonate on an active acid basis is about 0.03 to about 1 wt. %, preferably about 0.05 to about 0.5 wt. %, based on the weight of wood chips (dry basis) charged to the digester. The preferred phosphonate of formula (II) is $CH_3C(OH)(PO_3M_2)_2$.

When the aqueous composition of the invention is at least one compound of formula (III), the effective amount of amino carboxylate on an active acid basis is about 0.05 to about 1 wt. %, preferably about 0.1 to about 0.5 wt. %, based on the weight of wood chips (dry basis) charged to the digester.

When the aqueous composition of the invention is at least one phosphonate of formula (IV), the effective amount of phosphonate on an active acid basis is about 0.05 to about 1 wt. %, preferably about 0.1 to about 0.5 wt. %, based on the weight of wood chips (dry basis) charged to the digester. The preferred phosphonate of formula (IV) is 2-phosphonobutane-1,2,4-tricarboxylic acid.

When the aqueous composition of the invention is at least one amine oxide of the phosphonates of formula (I), the effective amount of amine oxide on an active acid basis is an amount similar to the effective amount of the corresponding phosphonate. Generally, the effective amount of amine oxide on an active acid basis is about 0.03 to about 1 wt. %, preferably about 0.1 to about 0.5 wt. %, based on the weight of wood chips (dry basis) charged to the digester. The preferred amine oxide of a phosphonate of formula (I) is $^{-}O\leftarrow{}^{+}N—(CH_2PO_3K_2)_3$.

When the aqueous composition of the invention is a mixture of at least two phosphonates of formula (I), the phosphonate(s) and the effective amount of each mixture is as follows:

When the first phosphonate is $(M_2O_3PCH_2)_2NCH_2CH_2CH_2N(CH_2PO_3M_2)CH_2CH_2N(CH_2PO_3M_2)$ $CH_2CH_2CH_2N(CH_2PO_3M_2)_2$, the second phosphonate is preferably selected from $N(CH_2PO_3M_2)_3$, $(M_2O_3PCH_2)_2NCH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)CH_2CH_2N(CH_2PO_3M_2)_2$. When the second phosphonate is $N(CH_2PO_3M_2)_3$, the amount of the mixture on an active acid basis is about 0.03 to about 1 wt. %, preferably about 0.05 to about 0.2 wt. %, based on the weight of wood chips (dry basis) charged to the digester. When the second phosphonate is selected from $(M_2O_3PCH_2)_2NCH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)CH_2CH_2N(CH_2PO_3M_2)_2$, the amount of the mixture on an active acid basis is about 0.03 to about 1 wt. %, preferably about 0.05 to about 0.2 wt. %, based on the weight of wood chips (dry basis) charged to the digester.

When the first phosphonate is $(M_2O_3PCH_2)_2NCH_2CH_2N(CH_2PO_3M_2)_2$, the second phosphonate is preferably selected from $(M_2O_3PCH_2)_2N(CH_2)_6N(CH_2PO_3M_2)_2$, $(M_2O_3PCH_2)_2NCH_2CH_2N(CH_2PO_3M_2)CH_2CH_2N(CH_2PO_3M_2)_2$, or $N(CH_2PO_3M_2)_3$, and the amount of the mixture on an active acid basis is about 0.03 to about 1 wt. %, preferably about 0.05 to about 0.2 wt. %, based on the weight of wood chips (dry basis) charged to the digester.

When the first phosphonate is $(M_2O_3PCH_2)_2N(CH_2)_6N(CH_2PO_3M_2)_2$, and the second phosphonate is $(M_2O_3PCH_2)_2NCH_2CH_2N(CH_2PO_3M_2)CH_2CH_2N(CH_2PO_3M_2)_2$ or $N(CH_2PO_3M_2)_3$, the amount of the mixture on an active acid basis is about 0.03 to about 1 wt. %, preferably about 0.05 to about 0.2 wt. %, based on the weight of wood chips (dry basis) charged to the digester.

When the first phosphonate is $(M_2O_3PCH_2)_2NCH_2CH_2N(CH_2PO_3M_2)CH_2CH_2N(CH_2PO_3M_2)_2$, and the second phosphonate is $N(CH_2PO_3M_2)_3$, the amount of the mixture on an active acid basis is about 0.03 to about 1 wt. %, preferably about 0.05 to about 0.2 wt. %, based on the weight of wood chips (dry basis) charged to the digester.

The preferred blends of at least two phosphonates of formula (I) are blends of $(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$ with $N(CH_2PO_3M_2)_3$, $(M_2O_3PCH_2)_2NCH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)CH_2CH_2N(CH_2PO_3M_2)_2$ When the aqueous composition of the invention is a mixture of at least one phosphonate of formula (I) and at least one phosphonate of formula (II), the phosphonate(s) and the effective amount of each is as follows:

Preferred blends are mixtures of a first phosphonate selected from $N(CH_2PO_3M_2)_3$, $(M_2O_3PCH_2)_2NCH_2CH_2N(CH_2PO_3M_2)CH_2CH_2N(CH_2PO_3M_2)_2$, $(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$, $(M_2O_3PCH_2)_2NCH_2CH_2N(CH_2PO_3M_2)_2$, or $(M_2O_3PCH_2)_2N(CH_2)_6N(CH_2PO_3M_2)_2$, and a second phosphonate selected from $CH_3C(OH)(PO_3M_2)_2$.

When the first phosphonate is selected from $(M_2O_3PCH_2)_2N(CH_2)_6N(CH_2PO_3M_2)_2$, $(M_2O_3PCH_2)_2NCH_2CH_2N(CH_2PO_3M_2)_2$, $(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$, or $(M_2O_3PCH_2)_2NCH_2CH_2N(CH_2PO_3M_2)CH_2CH_2N(CH_2PO_3M_2)_2$, the amount of the mixture on an active acid basis is about 0.03 to about 1 wt. %, preferably about 0.05 to about 0.2 wt. %, based on the weight of wood chips (dry basis) charged to the digester. When the first phosphonate is $N(CH_2PO_3M_2)_3$, the amount of the mixture on an active acid basis is about 0.03 to about 1 wt. %, preferably about 0.05 to about 0.2 wt. %, based on the weight of wood chips (dry basis) charged to the digester.

The most preferred blends of at least one phosphonate of formula (I) and at least one phosphonate of formula (II) are blends of $(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$ or $N(CH_2PO_3M_2)_3$, with $CH_3C(OH)(PO_3M_2)_2$.

A second embodiment of the invention relates to a method for improving properties of pulp produced, reducing the digester cycle time, or reducing the pulping or bleaching chemicals required in alkaline chemical pulping processes comprising adding an effective amount of at least one compound to the alkaline aqueous mixture in the digester of the chemical pulping process, wherein the at least one compound is as described above.

Optionally, other additives can be added with the compounds of the invention to the alkaline aqueous mixture in the digester. Typical additives include, but are not limited to, conventional additives known for use in the digester of a chemical pulping process. An example of a suitable additive that can be optionally added is anthroquinone.

In the practice of the method of this invention in a chemical pulping process, e.g. a Kraft process, the aqueous composition of the invention is admixed with an alkaline, aqueous composition in the digester. The aqueous composition of the invention can be added to the digester using any conventional means known to those of ordinary skill in the art. In addition, the aqueous composition of the invention can be added directly to the digester composition or it can be introduced into one of the aqueous feed compositions being charged to the digester prior to charging of that aqueous feed composition. The pH in the digester of an alkaline chemical pulping process is at least 9. In the case of a Kraft process, the pH in the digester is preferably about 10 to about 14, and more preferably about 12 to about 14. The temperature in the digester is typically in the range of about 110° C. to about 180° C., preferably about 150° C. to about 175° C. The aqueous composition of the invention can be added in a batch digester in any conventional manner known to one of ordinary skill in the art. For example, in a batch digester operation, the addition of the aqueous composition of the invention can be a bulk addition at the beginning of the digester cook cycle or during the digester cook cycle, or it can be added in multiple charges throughout the digestion cycle or continuously throughout the digester cook cycle. It is currently preferred to add the aqueous composition of the invention as a bulk charge at or near the beginning of the digester cook cycle. In the case of a continuous digester operation, the addition of the aqueous composition of the invention will typically be added continuously to maintain the effective concentration of the compounds of the invention.

The pulp that is recovered from the digester and washed can optionally be bleached using any conventional bleaching sequence depending on the desired end use of the pulp. Several bleaching sequences are used commercially in conjunction with chemical pulping processes. When bleaching is used, a majority of pulp mills use a 5-stage bleaching sequence. A common such bleaching sequence is the DEDED sequence. However, with the trend to reduce chlorine containing bleach steps, some pulp mills have moved to a bleaching sequence similar to $DE_{op}D$ or $DE_{op}P$. A less common bleaching sequence is the OPD sequence. The definitions for the letters used in the bleaching sequences are:

D=chlorine dioxide ($ClO_2$)

C=chlorine ($Cl_2$)

O=oxygen ($O_2$)

P=hydrogen peroxide ($H_2O_2$)

E=alkaline extraction $E_{op}$=alkaline extraction reinforced with oxygen and hydrogen peroxide H=sodium hypochlorite (NaOCl)

Z=ozone ($O_3$)

Bleaching processes are well known in the art and one of ordinary skill in the art will be able to practice any conventional bleaching sequence using pulp prepared using the process of the invention.

The use of the compounds of the invention in the process of the invention enable production of pulp with brightness comparable to pulp produced without use of the compounds of the invention but with a reduction in the amount of bleaching chemicals used or reduction in the number of bleaching steps. In the alternative, the use of the compounds of the invention in the process of the invention enable production of pulp with improved brightness compared to pulp produced without use of the compounds of the invention.

Viscosity is a measurement which relates viscosity of dissolved pulp to its strength properties. Mills use it as a way to test pulp properties quickly. Viscosity is related to the degree of cellulose polymerization and amount of lignin and hemicellulose attached to the fiber. Generally, as cellulose chains are broken and the lignin is removed, the viscosity decreases. The amount of damage to the fiber during the Kraft cook can be seen in the viscosity test. The compounds of the invention have been demonstrated in the examples herein to be good protectors of fiber strength during the Kraft cook. The benefits of achieving a higher viscosity at a given kappa number include the ability to cook a pulp longer and maintain a similar strength property or the ability to use more severe bleaching conditions to get a brighter pulp or use a process that is less expensive in chemical cost such as oxygen bleaching.

A small increase in yield of the pulp can result in a huge savings to the pulp mill. A yield increase means more pulp for the same amount of wood chips. This would also have the impact of lowering solids in the black liquor recovery area. Since many pulp mills are bottlenecked in the black liquor recovery area, this would allow some pulp mills to raise production without spending capital for additional equipment.

The use of the compounds of the invention generally result in decreasing the kappa number, so the pulp mill would have the ability to decrease the cook time or cook temperature (i.e. H-factor). Decreasing the Kraft cook temperature would result in less carbohydrate degradation. This would typically increase strength properties, viscosity and yield. Decreasing the cook time would allow a pulp mill to increase the number of Kraft cooks done in a day, i.e. increase the pulp production rate.

A third embodiment of the invention relates to the improved bleached and unbleached pulps prepared by the process of the invention.

One of ordinary skill in the art using this invention will be able to readily select an appropriate compound of the invention and concentration for addition to the digester to achieve the desired pulp property improvement or reduction in digester cycle time based on the disclosure of this specification. It will be apparent to those of skill in the art after reading this specification that many factors, including those of the type which have been mentioned herein, will determine the amount of the compounds of the invention needed to achieve the desired results. The determination of these amounts is within the ordinary skill of the artisan in this field without undue experimentation considering the direction provided herein.

The invention is further described in the following Examples which are not intended to limit or restrict the invention. Unless otherwise indicated all quantities are expressed by weight.

EXAMPLES

A Kraft cook test was employed in the following examples and illustrates the use of the process of this invention to determine the effect of the compositions of this invention as a pulp modifier in a Kraft cook. The general procedure described below was followed. Additionally, the tests were generally carried out at various concentrations as active acid based on the amount of wood chips (oven-dry basis) charged to the digester, for each inventive compound tested, and also with no added compound present.

As used herein, the active acid level is that amount of free acid which is equimolar to the amount of phosphonate or carboxylate that was actually added to the digester. Unless otherwise specified, use of "%" is on a weight basis.

Kraft Cook Test

The Kraft Cook Test used herein was developed to gauge the performance of the compositions of this invention in a simulated Kraft digester composition. The test was a standard Kraft cook in a model MK 610 Systems Inc. minimill laboratory digester. The digester aqueous composition temperature was ramped from ambient temperature to 170° C. in about 45 minutes and then maintained at 170° C. for the remainder of the test. Aspen or red pine wood chips were obtained from a pulp mill in the Upper Midwestern United States. Pulping conditions were: a 4:1 liquor to wood ratio, 16–20% AA (active alkali) and 25% sulfidity. The H-factor (length of cook) was varied in the cooks. The amount of phosphonate or carboxylate used was also varied.

Drying of Wood Chips

Aspen or pine wood chips that remained on a ¼-inch round-holed mesh screen were utilized in the test, while removing knots and oversize chips.

Some of the wood chips were air dried overnight by laying them out on a counter. Wood chips not air dried were stored in a cold room at 13° C. and used before they began to show signs of decay.

Preparation of White Liquor/Charge of Digester

A liquor to wood ratio of 4:1 was prepared with 16–20% active alkali, having a 25% sulfidity.

The charge of phosphonate or carboxylate employed was based upon the weight of wood chips (oven-dry basis) charged to the digester to give the desired equivalent wt. % of active acid in the digester.

White liquor was prepared according to the following procedure (for most runs), although some Kraft cooks used different AA. For an 18% AA, 25% sulfidity: 62 g caustic and 61 g sodium sulfide nonahydrate were added to 500 mL water. After all chemicals were dissolved, the final dilution was added, which depended on the moisture content of the wood chips.

350 grams (OD weight) of wood chips, prepared as described above, were added to the wood chip holder. White liquor (1 L) and wood chips were transferred to the digester and the initial temperature and time recorded.

Each Kraft cook test example below was carried out according to the general procedure recited above. In most examples, the phosphonates and/or carboxylates were tested at various concentration levels. All levels are given in weight percent phosphonate or carboxylate on an active acid basis per weight wood chips (oven-dry basis).

The phosphonates used individually and in blends in the examples were obtained from Solutia Inc. (St. Louis, Mo.). DTPA was obtained from Dow Chemical (Versenex 80™), caustic, sulfuric acid and hydrogen peroxide were from Mallinckrodt, sodium sulfide nonahydrate from EM Science, potassium chlorate and oxalic acid from Fisher Scientific, sodium thiosulfate from J. T. Baker, and the oxygen cylinders from Twin City Oxygen.

Pulp Property Testing

The pulp properties of most interest in the industry are the kappa number (related to lignin content in the pulp), pulp brightness, screened yield, reject amount, and pulp strength properties.

Test Procedures

Kappa number (TAPPI test method T236)
Screened yield (amount of oven dried ("OD") wood pulp passing through a 0.015 inch screen/total amount of OD starting pulp)
Reject rate (amount of OD wood pulp retained on a 0.015 inch screen/total amount of OD starting pulp)
ISO brightness (TAPPI test method T525)
Viscosity (TAPPI test method T230)
Tensile strength (TAPPI test method T494)
Burst strength (TAPPI test method T403)
Tear strength (TAPPI test method T414)
Handsheet making (TAPPI test method T220)

Pulp Bleaching

Several bleaching sequences were conducted to determine the bleaching response with the pulp treated according to the process of the invention compared to pulps prepared with no added compounds of the invention. The conditions used in the various bleach sequences were common for the paper industry.

Bleach Procedures

Pulp was prepared using the procedures described in the Kraft Cook Test section above. The pulp was thoroughly washed, so no carryover of the black liquor and/or compounds of the invention occurred.

The following bleach sequences were tested.

DEDED—Most pulp mills use a 5-stage bleaching sequence, a common one being the DEDED sequence. Pulp (30 g, OD wt. basis) was bleached in doubled plastic bags at 10% consistency at 70° C. using a hot water bath. Chemical dosage was varied depending on the stage. Bleaching times for $D_0$, $E_1$, $D_1$, $E_2$, and $D_2$ were 150, 60, 90, 60 and 90 minutes, respectively. Residual chlorine dioxide was tested after each D stage. The pH exiting each bleach stage was also measured.

$DE_{op}D$—With the trend to reduce chlorine-containing bleaches, some mills have moved to a bleaching sequence similar to DEopD. Pulp (60 g, OD wt. basis) was bleached in plastic bags for the D stages and used a Mark IV Quantum mixer or LS1200 Chemineer reactor for the $E_{op}$ stage. The D stages were bleached at 70° C., whereas the $E_{op}$ stage was at 90° C. The consistency was 10% for all three stages. The D stages had different amounts of chemical charge. The $E_{op}$ stage used 1% peroxide, 3% caustic, 0.1% magnesium sulfate, and 30, 40 or 100 psi oxygen gas. The pulp in the $E_{op}$ stage was mixed for 4 seconds every 12 seconds. End pH, residuals and brightness were taken after every stage.

$DE_{op}P$—The D, $E_{op}$, and P stages used 60, 240, and 30 g pulp (OD wt. basis), respectively. The bleaching times were 90, 60 and 120 minutes, respectively. The bleaching temperatures were 70, 90 and 85–87° C., respectively. The D stage used 1% chlorine dioxide on pulp. The $E_{op}$ stage used 1% peroxide, 3% caustic, 0.1% magnesium sulfate, and 30, 40 or 100 psi oxygen gas. This stage used both a Mark IV Quantum mixer and LS1200 Chemineer reactor for the bleaching. The P stage used 1% peroxide, 2% caustic, 0.1% magnesium sulfate, and 1.5% sodium silicate based on OD pulp. Residuals, end pH, and brightness were determined after each stage.

OPD—The O, P and D stages all used 60 g pulp (OD wt. basis). The O stage used 2.5% caustic, 0.1% magnesium oxide, 90 psi oxygen gas, 10 or 15% consistency, 45 minute retention time, and 90° C. in a Mark IV Quantum mixer. The P stage used 2% caustic, 0.1% magnesium sulfate, 1.5% sodium silicate, 1.2% peroxide, 10% consistency, and 120 minutes at 85–88° C. The D stage used 0.8% chlorine dioxide, 0.3% caustic per 1% chlorine dioxide, and 90 minutes at 70° C. Residuals, end pH, and brightness were determined after each stage.

Bleached Pulp Property Testing

In addition to the pulp tests described above, chlorine dioxide and hydrogen peroxide residual levels were determined by iodine back titration.

Example 1

A series of Kraft cooks were performed on air dried hardwood (aspen) wood chips according to the procedure described in the Pulping Description section of the Examples using either no phosphonate (control) or various phosphonates at various concentrations. The pulp was recovered and tested and the results presented in Table 3.

The data in Table 3 demonstrates that the phosphonates of the invention produce pulp with lower kappa number, higher brightness and/or equivalent or improved strength properties.

Example 2

A series of Kraft cooks were performed on undried hardwood (aspen) wood chips according to the procedure described in the Pulping Description section of the Examples using either no phosphonate (control) or using inventive compounds Dequest 2066 or DTPA at various concentrations. The pulp was recovered and tested and the results presented in Table 4.

The data in Table 4 demonstrates that Dequest 2066 and DTPA at effective concentrations produce pulp with lower kappa number, higher brightness and equivalent or improved strength properties.

TABLE 3

Screening Cooking Experiments on Hardwood (Aspen)

| Sample/ Conc. | | Yield, % | Kappa No. | Freeness, mL | Basic Weight, g/m2 | Bulk, cm2/g | Brightness, % | Tensile Index, N-m/g | Burst Index KPa-m2/g | Tear Index, MN-m2/g |
|---|---|---|---|---|---|---|---|---|---|---|
| Control | | | | | | | | | | |
| #1 | | 51.6 | 19.9 | 675 | 60.3 | 2.07 | 27.8 | 30.4 | 2.51 | 5.07 |
| #2 | | 53.5 | 19.5 | 701 | 61 | 2.22 | 28.2 | 29.2 | 2.01 | 5.15 |
| #3 | | 53.1 | 21.6 | 706 | 59.9 | 2.2 | 26.5 | 26.9 | 1.98 | 5.34 |
| Avg. | | 52.7 | 20.3 | 694 | 60.4 | 2.16 | 27.5 | 28.8 | 2.17 | 5.19 |
| D2006 | 0.03% | 51.4 | 21.2 | 701 | 61.3 | 2.2 | 26.7 | 25.7 | 1.75 | 5.25 |
| | 0.20% | 51.5 | 18.1 | 691 | 61.2 | 2.23 | 30.3 | 29.8 | 2.04 | 5.29 |
| | 0.50% | 49.6 | 16.4 | 691 | 60.5 | 2.19 | 32 | 30.6 | 2.03 | 5.45 |
| D2016 | 0.03% | 52.3 | 21.6 | 703 | 60 | 2.19 | 27.1 | 26.7 | 1.83 | 4.97 |
| | 0.20% | 51.6 | 16.2 | 688 | 60.8 | 2.12 | 32.6 | 30.7 | 2.23 | 5.37 |
| | 0.50% | 51.7 | 15.2 | 688 | 60.4 | 2.13 | 33.9 | 28.3 | 1.95 | 5.85 |
| D2066 | 0.03% | 51.7 | 19.4 | 691 | 60.9 | 2.12 | 28.9 | 29.2 | 2.05 | 5.36 |
| | 0.20% | 50.4 | 17.8 | 691 | 60.7 | 2.11 | 30.4 | 29.9 | 2.09 | 5.11 |
| | 0.50% | 49.3 | 15 | 686 | 60.9 | 2.15 | 33.8 | 30.7 | 2.15 | 5.21 |
| 4NHMP | 0.03% | 52.9 | 19.8 | 690 | 60.5 | 2.2 | 27 | 24.8 | 1.71 | 5.45 |
| | 0.20% | 53.3 | 16.9 | 686 | 61.1 | 2.22 | 29.6 | 31.1 | 2.14 | 5.91 |
| | 0.50% | 54.3 | 15.8 | 683 | 60.6 | 2.22 | 32.4 | 31.3 | 2.15 | 5.75 |
| D2054 | 0.03% | 53.9 | 21.3 | 688 | 60.9 | 2.07 | 25.5 | 28 | 1.89 | 4.95 |
| | 0.20% | 54.4 | 20.4 | 686 | 61.8 | 2.32 | 27.7 | 28.3 | 1.89 | 5.84 |
| | 0.50% | 53 | 17.2 | 679 | 62 | 2.19 | 30.3 | 31.4 | 2.16 | 6.77 |
| D6004 | 0.03% | 54.1 | 20.2 | 685 | 61.5 | 2.25 | 27.3 | 27.6 | 1.8 | 5.38 |
| | 0.20% | 54.6 | 18 | 681 | 61.6 | 2.24 | 29.8 | 27.7 | 1.81 | 5.41 |
| | 0.50% | 54.6 | 16.8 | 682 | 61.4 | 2.13 | 31 | 26 | 2.31 | 5.57 |
| D2060S | 0.03% | 53.2 | 19.6 | 691 | 62 | 2.18 | 27.5 | 27.7 | 2.28 | 5.44 |
| | 0.20% | 53.3 | 17.9 | 691 | 62.4 | 2.12 | 29.1 | 27.8 | 2.31 | 5.68 |
| | 0.50% | 53.1 | 16.5 | 692 | 62.5 | 2.24 | 32.3 | 29.5 | 1.95 | 6.03 |

TABLE 3-continued

Screening Cooking Experiments on Hardwood (Aspen)

| Sample/ Conc. | | Yield, % | Kappa No. | Freeness, mL | Basic Weight, g/m2 | Bulk, cm2/g | Brightness, % | Tensile Index, N-m/g | Burst Index KPa-m2/g | Tear Index, MN-m2/g |
|---|---|---|---|---|---|---|---|---|---|---|
| D7000 | 0.03% | 54 | 21.7 | 707 | 61.1 | 2.13 | 25.1 | 29 | 1.58 | 4.57 |
| | 0.20% | 54.3 | 21.3 | 707 | 61.2 | 2.13 | 25.7 | 29.2 | 1.7 | 4.81 |
| | 0.50% | 53.9 | 19.8 | 692 | 61.4 | 2.12 | 26.8 | 28.1 | 1.92 | 5.11 |

1 Conditions: AA = 18%, H-factor-1000, Sulfidity = 25%, Max. temperature = 170° C., Air dried wood chips.
2 Concentration of samples used (active acid basis) is based on the weight of wood chips (dry basis) charged to digester.

TABLE 4

Cooking Experiments on Hardwood (Aspen)[1]

| | Control | | | 2066%[2] | | | | | | 2066A%[2] | | | DTPA[2] | |
|---|---|---|---|---|---|---|---|---|---|---|---|---|---|---|
| | 1 | 2 | Avg. | 0.05 | 0.10 | 0.20 | 0.30 | 0.40 | 0.50 | 0.03 | 0.20 | 0.50 | 0.20 | 0.50 |
| Property | | | | | | | | | | | | | | |
| Yield % | 50.9 | 51.2 | 51 | 49.8 | 51.5 | 50.8 | 51.4 | 50.2 | 50.6 | 51 | 51.4 | 50.2 | 51 | 50.7 |
| Kappa No. | 16.4 | 17.5 | 16.9 | 16.12 | 16.07 | 13.8 | 13.6 | 13.43 | 12.8 | 16 | 14 | 13.3 | 16.3 | 14 |
| Freeness, ml @ 20 C. | 664 | 669 | 666 | 679 | 675 | 669 | 670 | 672 | 674 | | | | 658 | 664 |
| Basic Weight, g/m^2 | 61.1 | 61.12 | 61.1 | 60.75 | 60.9 | 61 | 61 | 60.4 | 61.37 | 61 | 61.2 | 61.4 | 60.62 | 61.2 |
| Bulk, cm^3/g | 1.93 | 1.853 | 1.89 | 1.913 | 1.935 | 1.915 | 1.901 | 1.896 | 1.908 | 1.921 | 1.937 | 1.913 | 1.86 | 1.891 |
| Brightness | 31.2 | 29.2 | 30.2 | 30.7 | 31.4 | 35.1 | 35.5 | 35.2 | 36 | 31.1 | 35.1 | 36.9 | 30.1 | 33.6 |
| Tensile Index, N*m/g | 31.04 | 32.51 | 31.77 | 32.54 | 33 | 33.763 | 33.74 | 33.87 | 33.9 | 32.9 | 32.07 | 31.36 | 32.62 | 32.83 |
| Burst index, kPa*m^2/g | 1.807 | 2.3 | 2.05 | 2.257 | 2.195 | 2.294 | 2.186 | 2.156 | 2.103 | 2.13 | 2.132 | 2.201 | 2.387 | 2.513 |
| Tear index, mN*m^2/g | 4.52 | 4.789 | 4.65 | 4.754 | 5.103 | 5.27 | 5.321 | 5.15 | 4.988 | 5.334 | 5.591 | 5.174 | 4.492 | 4.74 |
| Classification of fiber lengths (%)* | | | | | | | | | | | | | | |
| R14 | 0 | 0 | 0 | 0 | 0 | 0 | 0 | 0 | 0 | | | | 0 | 0 |
| R28 | 2.71 | 2.89 | 2.8 | 2.92 | 3.98 | 7.79 | 10.85 | 11.21 | 11.48 | | | | 6.11 | 7.81 |
| R48 | 60.02 | 62.53 | 61.27 | 61.35 | 61.85 | 62.78 | 63.93 | 63.71 | 63.22 | | | | 65.12 | 64.04 |
| R100 | 29.08 | 25.35 | 27.22 | 27.1 | 25.75 | 22.66 | 18.97 | 18.58 | 18.15 | | | | 21.33 | 19.9 |
| P100 | 8.19 | 8.13 | 8.16 | 8.63 | 8.42 | 6.77 | 6.25 | 6.5 | 7.15 | | | | 7.44 | 8.25 |

[1]Conditions: AA = 18%, H-factor = 1000, Sulfidity = 25%, Max. temperature = 170° C., undried wood chips.
[2]Concentration of samples used (active acid basis) is based on the weight of wood chips (dry basis) charged to digester.
[3]Bauer-McNett fiber classification method (TAPPI test method T233cm-95)

Example 3

A series of Kraft cooks were performed on undried softwood (pine) wood chips according to the procedure described in the Pulping Description section of the Examples using either no phosphonate (control) or using inventive compounds Dequest 2066 or DTPA at various concentrations. The pulp was recovered and tested and the results presented in Table 5.

The data in Table 5 demonstrates that DTPA and selected phosphonates of the invention produce pulp from softwood with lower kappa number, higher brightness or improved burst index. Generally, DTPA and all of the phosphonates tested produced pulp having higher burst index. Dequest products 2006, 2016, 2060S, 6004 and 7000 produced pulp having higher brightness, and Dequest products 2006, 2016, 2060S, 6004 and 7000, and compound 4NHMP produced pulp with lower kappa number.

TABLE 5

Screening Cooking Experiments on Softwood (Pine)[1]

| Sample[2] | Yield, % | Kappa No. | Basic Weight, g/m$^2$ | Bulk, cm$^2$/g | Brightness % | Tensile Index, N-m/g | Burst Index kPa-m$^2$/g | Tear Index, MN-m$^2$/g |
|---|---|---|---|---|---|---|---|---|
| Control | | | | | | | | |
| #1 | 41.8 | 24 | 61.2 | 2.32 | 29.2 | 47.06 | 4.313 | 21.54 |
| #2 | 43.03 | 24.1 | 59.8 | 2.314 | 28.6 | 46.92 | 4.268 | 22.78 |
| Avg. | 42.4 | 24.05 | 60.5 | 2.317 | 28.9 | 46.99 | 4.29 | 22.16 |

TABLE 5-continued

Screening Cooking Experiments on Softwood (Pine)[1]

| Sample[2] | Yield, % | Kappa No. | Basic Weight, g/m$^2$ | Bulk, cm$^2$/g | Brightness % | Tensile Index, N-m/g | Burst Index kPa-m$^2$/g | Tear Index, MN-m$^2$/g |
|---|---|---|---|---|---|---|---|---|
| 2066A | | | | | | | | |
| 0.05% | 42.8 | 25.5 | 60.5 | 2.3 | 28.9 | 46.57 | 4.693 | 23.76 |
| 0.20% | 43 | 24.9 | 61.2 | 2.32 | 28 | 48.61 | 4.785 | 23.08 |
| 0.50% | 42.9 | 24.4 | 60.8 | 2.372 | 28.5 | 49.2 | 4.871 | 21.43 |
| 2060S | | | | | | | | |
| 0.05% | 42.6 | 25.1 | 60.8 | 2.338 | 28.6 | 47.2 | 4.47 | 23.1 |
| 0.20% | 41.7 | 23.2 | 62.4 | 2.27 | 29.14 | 48.55 | 4.453 | 24.87 |
| 0.50% | 42.1 | 23.6 | 61.1 | 2.316 | 28.7 | 48.65 | 4.721 | 24.54 |
| 2066 | | | | | | | | |
| 0.05% | 42.8 | 25.86 | 60.8 | 2.332 | 28.6 | 47.12 | 4.35 | 23.16 |
| 0.20% | 43 | 25.8 | 61.67 | 2.354 | 28.4 | 47.76 | 4.38 | 22.92 |
| 0.50% | 43.1 | 24.9 | 61.9 | 2.31 | 27.7 | 48.72 | 4.53 | 22.25 |
| 2054 | | | | | | | | |
| 0.05% | 42.3 | 24.7 | 61 | 2.32 | 29 | 46.94 | 4.4 | 22.9 |
| 0.20% | 42.6 | 22.7 | 60.9 | 2.317 | 29 | 46.82 | 4.38 | 22.87 |
| 0.50% | 42.1 | 25 | 61.1 | 2.327 | 27.7 | 47.54 | 4.53 | 23.7 |
| 4NHMP | | | | | | | | |
| 0.05% | 42.2 | 23.7 | 60.5 | 2.31 | 28.9 | 47.41 | 4.5 | 23.5 |
| 0.20% | 41.9 | 22.9 | 61.29 | 2.26 | 28.56 | 47.81 | 4.521 | 22.82 |
| 0.50% | 43.2 | 24.5 | 62.14 | 2.243 | 28.48 | 46.48 | 4.217 | 23.11 |
| 2006 | | | | | | | | |
| 0.05% | 41.7 | 23.6 | 61.2 | 2.327 | 29.5 | 47.91 | 4.34 | 22.9 |
| 0.20% | 41.8 | 20.8 | 60.78 | 2.3 | 29.7 | 48.76 | 4.36 | 22.48 |
| 0.50% | 42.2 | 20.3 | 59.65 | 2.313 | 29.8 | 49.82 | 4.4 | 21.74 |
| 2016 | | | | | | | | |
| 0.05% | 42.8 | 24 | 59.9 | 2.29 | 28.9 | 46.3 | 4.51 | 24.36 |
| 0.20% | 42.5 | 22.5 | 60.93 | 2.281 | 28.5 | 46.92 | 4.756 | 24.47 |
| 0.50% | 41.6 | 20.7 | 60.71 | 2.26 | 29.1 | 48.9 | 4.681 | 25.59 |
| 6004 | | | | | | | | |
| 0.05% | 40.9 | 24.7 | 62.15 | 2.32 | 28.9 | 47.13 | 4.29 | 21.9 |
| 0.20% | 41.8 | 23.76 | 61.74 | 2.268 | 27.6 | 46.83 | 4.385 | 22.63 |
| 0.50% | 42.3 | 23.4 | 60.95 | 2.25 | 30.14 | 46.57 | 4.805 | 23.18 |
| 7000 | | | | | | | | |
| 0.05% | 41.5 | 24.5 | 61.8 | 2.317 | 29.3 | 47.75 | 4.37 | 23.1 |
| 0.20% | 43.09 | 22.54 | 61.04 | 2.32 | 29.5 | 47.71 | 4.413 | 22.96 |
| 0.50% | 42.36 | 23.4 | 60.15 | 2.328 | 29.2 | 48.63 | 4.642 | 22.61 |
| DPTA | | | | | | | | |
| 0.20% | 42.86 | 24.91 | 59 | 2.31 | 29 | 44.44 | 4.342 | 21.76 |
| 0.50% | 42.7 | 24.6 | 60 | 2.207 | 28.3 | 47 | 4.778 | 22.64 |

[1]Conditions: AA = 20%, H-factor = 1700, Sulfidity = 25%, Max. temperature = 170° C., unair-dried wood chips

[2]Concentration if samples used (active acid basis) is based on the weight of wood chips (dry basis) charged to digester.

Example 4

A series of Kraft cooks were performed on undried softwood (pine) wood chips according to the procedure described in the Pulping Description section of the Examples using either no phosphonate (control) or using inventive compounds Dequest products 2006 and 2054 at various concentrations. The pulp was recovered and tested and the results presented in Table 6.

The data in Table 6 demonstrates that selected phosphonates of the invention produce pulp from softwood with lower kappa number and/or improved strength. Dequest product 2006 generally produced pulp having lower kappa number and improved strength, and Dequest product 2054 generally produced pulp with improved strength.

Example 5

Kraft cooks were performed on undried hardwood (aspen) and softwood (pine) wood chips according to the procedure described in the Pulping Description section of the Examples using either no phosphonate (control) or using inventive compound Dequest 2066 or 2006 at 0.2 wt. % (as active acid based on the weight of wood chips (dry basis) charged to the digester). The pulp was recovered and tested and the results presented in Table 7.

The data in Table 7 demonstrates that (at constant H-factor) a reduced amount of white liquor, i.e. alkali, can be used to achieve the same level of cook when using the phosphonate of the invention.

TABLE 6

| Cooking experiments on Softwood (Pine)[1] | | | | | | | | | | | | | | |
|---|---|---|---|---|---|---|---|---|---|---|---|---|---|---|
| | Dosage Level %[2] | | | | | | | | | | | | | |
| | Control | 2054[2] | | | | | | 2006 | | | | | | |
| | 0 | 0.05 | 0.1 | 0.2 | 0.3 | 0.4 | 0.5 | 0 | .05 | 0.1 | 0.2 | 0.3 | 0.4 | 0.5 |
| Yield % | 42.4 | 42.3 | 43.2 | 42.75 | 42.17 | 42.81 | 42.1 | 42.4 | 41.7 | 42.2 | 41.8 | 42.7 | 41.2 | 42.2 |
| Kappa no. | 24.05 | 24.7 | 22.91 | 24.4 | 25.29 | 23.29 | 25 | 24.05 | 23.6 | 20.86 | 20.8 | 24.71 | 21.44 | 20.3 |
| Basic Weight, g/m^2 | 60.5 | 61 | 61.5 | 61.58 | 61 | 61.8 | 61.1 | 60.5 | 61.2 | 60.5 | 60.78 | 62.08 | 59.5 | 59.65 |
| Bulk, cm^3/g | 2.317 | 2.32 | 2.249 | 2.33 | 2.221 | 2.02 | 2.327 | 2.317 | 2.327 | 2.305 | 2.3 | 2.39 | 2.119 | 2.313 |
| Brightness % | 28.9 | 29 | 29.69 | 27.6 | 29.23 | 28.67 | 27.7 | 28.9 | 29.5 | 30.1 | 29.7 | 27.87 | 26.8 | 29.8 |
| Tensile Index, N*m/g | 46.99 | 46.94 | 47.27 | 49.16 | 48.6 | 51.7 | 47.54 | 46.99 | 47.91 | 48.56 | 48.76 | 50.22 | 48.02 | 49.82 |
| Burst index, kPa*m^2/g | 4.29 | 4.4 | 4.47 | 4.67 | 4.493 | 4.98 | 4.58 | 4.29 | 4.34 | 4.54 | 4.36 | 4.58 | 4.36 | 4.4 |
| Tear index, mN^m2/g | 22.16 | 22.9 | 22.85 | 23.12 | 22.9 | 23.42 | 23.7 | 22.16 | 22.9 | 22.43 | 22.48 | 23.43 | 22.16 | 21.74 |

[1]Conditions: AA = 20%, H-factor-1700, Sulfidity = 25%, Max. temperature = 170° C., unairdried pine chips
[2]Concentration of samples used (active acid basis) is based on the weight of wood chips (dry basis) charged to digester.

TABLE 7

| Residual Alkali | | | | |
|---|---|---|---|---|
| | Hardwood (Aspen)[1] | | Softwood (Pine)[2] | |
| Property | Control | 2066 (0.2%) | Control | 2066 (0.2%) |
| Kappa No. | 15.2 | 13.9 | 23.9 | 23.8 |
| Black Liquor: | | | | |
| pH | 13.3 | 13.61 | 13.38 | 13.53 |
| Residual Alkali (RA) | 22 | 24.8 | 13.8 | 13.95 |
| Pulp reject, % on screened pulp | 0.6 | 0.82 | 0.91 | 1.15 |

[1]Conditions: AA = 18%, HF 1000, Sulfidity = 25%, Temperature = 170° C., unairdried wood chips
[2]Conditions: AA = 20%, HF 1700, Sulfidity = 25%, Temperature = 170° C., unairdried wood chips

Example 6

A series of Kraft cooks were performed on undried hardwood (aspen) wood chips according to the procedure described in the Pulping Description section of the Examples using either no phosphonate (control) or using inventive compounds Dequest 2016 or 2066, or DTPA at various concentrations to test the effect of H-factor. The pulp was recovered and tested and the results presented in Table 8.

The data in Table 8 demonstrates that Dequest 2016 and 2066, and DTPA at effective concentrations produce pulp with lower kappa number and higher brightness. Dequest 2016 and 2066 generally produce pulp with higher viscosity, with the effect with Dequest 2066 being more pronounced. As H-factor is reduced, e.g. at H-factors HF705 and HF558, the % reject is significantly less for pulps produced using Dequest 2016 and 2066, and DTPA.

Example 7

The pulps from the series of Kraft cooks performed in Example 6 were tested for pulp strength and the results presented in Table 9.

The data in Table 9 demonstrates that Dequest 2016 and 2066 produce pulp with better overall strength properties, while DTPA produces pulp with comparable strength properties. These results are in addition to the improvement in pulp, properties shown in Table 9.

TABLE 8

| Hardwood (Aspen) Kraft Cooks H-Factor Effect | | | | | | |
|---|---|---|---|---|---|---|
| Sample | H-Factor[1] | Kappa number | Yield, % | Reject, % | Viscosity, cP | Bright-ness, % |
| Control: | HF1000 | 20.7 | 52.9 | 0.54 | 32.4 | 30.6 |
| | HF853 | 22.5 | 52.7 | 1.75 | 39.4 | 29.2 |
| | HF705 | 24.5 | 51.2 | 4.1 | 73.7 | 28.2 |
| | HF558 | 28 | 45.6 | 15.85 | 48.3 | 28 |
| 2016 (0.05%) | HF705 | 19.1 | 52.8 | 1.89 | 42.2 | 32.4 |
| 2016 (0.1%) | HF705 | 18.12 | 53.7 | 0.8 | 42.7 | 33.1 |
| 2016 (0.2%) | HF1000 | 14.94 | 53.9 | 0.54 | 33.8 | 35.5 |
| | HF853 | 16.02 | 53.5 | 1.07 | 39.6 | 34.4 |
| | HF705 | 17.06 | 53.9 | 2.12 | 43.1 | 35.2 |
| | HF558 | 18.3 | 52.1 | 3.73 | 51.9 | 35.1 |
| 2016 (0.3%) | HF705 | 15.67 | 53.14 | 2.04 | 43.3 | 36.2 |
| 2016 (0.4%) | HF705 | 14.75 | 53.24 | 2.42 | 43 | 37.1 |
| 2016 (0.1%) | HF1000 | 16.49 | 52.9 | 0.81 | 33.7 | 31.4 |
| | HF853 | 16.92 | 51.43 | 1.57 | 38.1 | 32 |
| | HF705 | 18.3 | 51.7 | 2.84 | — | — |
| | HF558 | 21.44 | 49.4 | 5.27 | 51.2 | 31.5 |
| 2066 (0.2%) | HF1000 | 16.12 | 50.22 | 1.87 | 34.8 | 33.1 |
| | HF853 | 16.6 | 51.2 | 1.88 | 38.5 | 33.8 |
| | HF705 | 18.57 | 50.17 | 3.87 | 45.4 | 33.7 |
| | HF558 | 20.08 | 48.6 | 6.18 | 52 | 33.5 |
| DTPA (0.2%) | HF1000 | 18.69 | 51.65 | 1.05 | — | — |
| | HF853 | 19.2 | 52.55 | 1.52 | — | — |
| | HF705 | 18.95 | 52.86 | 3.24 | 40.2 | 31.5 |
| | HF558 | 24.53 | 50.63 | 7.56 | — | — |

[1]Total Cooking Time
HF1000 = 105 min. (45 min. heat up, 60 min. at 170° C.);
HF853 = 95 min. (45 min. heat up, 50 min. at 170° C.);
HF705 = 85 min. (45 min. heat up, 40 min. at 170° C.);
HF558 = 75 min. (45 min. heat up, 30 min. at 170° C.).
[2]Concentration of samples used (active acid basis) is based on the weight of wood chips (dry basis) charged to digester.
[3]—: not determined.

TABLE 9

| Hardwood (Aspen) Strength | | | | | | | | |
|---|---|---|---|---|---|---|---|---|
| | Control | | | | 2016 (0.2%) | | | |
| | HF1000 | HF853 | HF705 | HF558 | HF1000 | HF853 | HF705 | HF558 |
| B.W. g/m^2 | 61.65 | 61.89 | 62.15 | 61.68 | 61.14 | 62.15 | 62.26 | 61.65 |
| Bulk, cm^3/g | 1.95 | 1.984 | 2.05 | 2.03 | 1.937 | 1.951 | 1.963 | 1.962 |
| Brightness % | 30.6 | 29.2 | 28.2 | 28 | 35.5 | 34.4 | 35.2 | 35.1 |
| Tensile, N*m/g | 23 | 22.23 | 22.2 | 21.17 | 26.24 | 24.4 | 23.77 | 22.13 |
| Burst, kPa*m^2/g | 1.07 | 0.88 | 0.89 | 0.84 | 1.04 | 1 | 0.98 | 0.83 |
| Tear, mN*m^w/g | 4.38 | 3.867 | 3.4 | 3.34 | 4.72 | 3.867 | 3.813 | 3.755 |

| | 2016 series, HF705 | | | | | DTPA (0.2%) |
|---|---|---|---|---|---|---|
| | 0.05% | 0.10% | 0.20% | 0.30% | 0.40% | HF705 |
| B.W. g/m^2 | 61.6 | 61.82 | 62.26 | 61.75 | 61.76 | 61.53 |
| Bulk, cm^3/g | 2.032 | 2.028 | 1.963 | 1.972 | 1.97 | 2.043 |
| Brightness % | 32.4 | 33.1 | 35.2 | 36.2 | 37.1 | 31.5 |
| Tensile, N*m/g | 21.28 | 22.6 | 23.77 | 23.55 | 22.83 | 20.75 |
| Burst, kPa*m^2/g | 0.877 | 0.882 | 0.98 | 0.878 | 0.834 | 0.803 |
| Tear, mN*m^w/g | 3.98 | 3.78 | 3.813 | 3.74 | 3.97 | 3.72 |

| | 2066 (0.2%) | | | | 2016 (0.1%) | | | |
|---|---|---|---|---|---|---|---|---|
| | HF1000 | HF853 | HF705 | HF558 | HF1000 | HF853 | HF705 | HF558 |
| B.W. g/m^2 | 61.45 | 60.93 | 60.8 | 61.16 | 60.79 | 61.26 | 61.82 | 61.2 |
| Bulk, cm^3/g | 2.005 | 1.978 | 1.975 | 1.954 | 2.019 | 2.023 | 2.028 | 1.999 |
| Brightness % | 33.1 | 33.8 | 33.7 | 33.5 | 31.4 | 32 | 33.1 | 31.5 |
| Tensile, N*m/g | 28.08 | 26.67 | 25.96 | 25 | 26.51 | 24.65 | 22.6 | 23.03 |
| Burst, kPa*m^2/g | 1.05 | 0.97 | 0.97 | 0.95 | 0.94 | 0.87 | 0.88 | 0.85 |
| Tear, mN*m^w/g | 4.23 | 4.1 | 4.04 | 3.93 | 4.29 | 4.02 | 3.78 | 3.79 |

Example 8

The pulps from the series of Kraft cooks performed in Example 6 were tested for pulp fiber classification using both the Bauer-McNett and Kajaani methods and the results presented in Tables 10 and 11, respectively.

In the Bauer-McNett method, the larger the number, the smaller the mesh opening and the reported values is the % of fibers that are retained at that screen size. For example, R14 means that the mesh has 14 openings per square inch. P100 means the amount of fibers passing through the R100 mesh screen. The data indicate that the pulps prepared according to the invention have slightly lower percentages of the fibers as medium and long fibers. This suggests that increased yield maintains shorter fibers in the recovered product.

The data in Tables 10 and 11 demonstrate the impact of treating the pulp with these products in the digester. As can be seen after final pulp bleaching, the fiber length was not negatively impacted by treatment with the compounds of the invention in the digester. The W weighted average fiber length data in Table 11 is more useful for fiber length when making this comparison. As Dequest 2010 charge is increased, both fiber length and coarseness decrease slightly compared to the control, indicating more intense cooking of the fiber or more of the material attached to the fiber is being removed.

Example 9

A series of Kraft cooks were performed on undried hardwood (aspen) wood chips according to the procedure described in the Pulping Description section of the Examples using either no phosphonate (control) or using inventive phosphonate blends at various concentrations. The pulp was recovered and tested and the results presented in Table 12.

The data in Table 12 demonstrates that the Dequest blends all produced pulps with lower kappa number and higher brightness. The Dequest blends also produced pulp with comparable or higher yields. In addition, the Dequest blends generally had lower % reject than the control.

TABLE 10

| Hardwood (Aspen) Kraft Pulp Classification by Bauer-McNett[1] | | | | | | | |
|---|---|---|---|---|---|---|---|
| Sample % | H-Factor | R14 Mesh | R28 mesh | R48 mesh | R100 mesh | R24 + R48 | P100 |
| Control: | HF1000 | 0 | 14.2 | 62.6 | 18.4 | 76.8 | 4.8 |
| | HF853 | 0 | 14.9 | 63.4 | 18 | 78.3 | 3.7 |
| | HF705 | 0 | 18.5 | 62 | 17.2 | 80.5 | 2.3 |
| | HF558 | 0 | 22.5 | 58.2 | 16.4 | 80.7 | 2.9 |
| 2066 | HF1000 | 0 | 2.6 | 63.6 | 27.3 | 66.2 | 6.5 |
| (0.2%) | HF853 | 0 | 6.5 | 64.5 | 23.5 | 71 | 5.5 |
| | HF705 | 0 | 11.4 | 62.8 | 20.7 | 74.2 | 5.1 |
| | HF558 | 0 | 12.83 | 63.1 | 19.85 | 75.93 | 4.22 |
| 2016 | HF1000 | 0 | 9.1 | 61.2 | 23.6 | 70.3 | 6.1 |
| (0.2%) | HF853 | 0 | 11 | 61.9 | 21.8 | 72.9 | 5.3 |
| | HF705 | 0 | 12.1 | 62 | 21.9 | 74.1 | 4 |
| | HF558 | 0 | 13.8 | 62.7 | 19.7 | 76.5 | 3.8 |
| HF705: | 2016 (0.05%) | 0 | 3.6 | 64.6 | 27.2 | 68.2 | 4.6 |
| | 2016 (0.1%) | 0 | 10.3 | 62.2 | 23.4 | 72.5 | 4.1 |
| | 2016 (0.2%) | 0 | 12.1 | 62 | 21.9 | 74.1 | 4 |
| | 2016 (0.3%) | 0 | 13.5 | 60.9 | 21.4 | 74.4 | 4.2 |
| | 2016 (0.4%) | 0 | 12.8 | 62 | 21.64 | 74.8 | 3.56 |

[1]TAPPI test method T233cm-95

TABLE 11

Hardwood (Aspen) Kraft Pulp Fiber Lengths By Kajaani FS-200[1]

| | | Arithmetic ave, mm | L weighted ave, mm | W weighted ave, mm | Coarseness, mg/m |
|---|---|---|---|---|---|
| Control: | HF1000 | 0.68 | 0.87 | 1 | 0.112 |
| | HF853 | 0.69 | 0.89 | 1.01 | 0.114 |
| | HF705 | 0.71 | 0.92 | 1.04 | 0.123 |
| | HF558 | 0.75 | 0.97 | 1.12 | 0.147 |
| 2016 | HF1000 | 0.66 | 0.85 | 0.98 | 0.106 |
| (0.2%): | HF853 | 0.67 | 0.86 | 0.98 | 0.104 |
| | HF705 | 0.66 | 0.87 | 0.99 | 0.108 |
| | HF558 | 0.68 | 0.86 | 0.98 | 0.113 |
| 2016 | HF1000 | 0.66 | 0.86 | 0.99 | 0.103 |
| (0.1%): | HF853 | 0.69 | 0.88 | 1 | 0.101 |
| | HF705 | 0.66 | 0.86 | 0.99 | 0.108 |
| | HF558 | 0.69 | 0.89 | 1.01 | 0.113 |
| 2066 | HF1000 | 0.65 | 0.86 | 0.99 | 0.101 |
| (0.2%): | HF853 | 0.68 | 0.87 | 1 | 0.104 |
| | HF705 | 0.67 | 0.88 | 1.01 | 0.107 |
| | HF558 | 0.69 | 0.88 | 1 | 0.109 |
| DTPA | HF1000 | 0.67 | 0.85 | 0.98 | 0.109 |
| (0.2%): | HF853 | 0.69 | 0.86 | 0.98 | 0.107 |
| | HF705 | 0.66 | 0.85 | 0.97 | 0.112 |
| Control: | HF558 | 0.7 | 0.9 | 1.04 | 0.122 |
| 2016 (0.00%): | HF705 | 0.71 | 0.92 | 1.04 | 0.123 |
| 2016 (0.05%): | HF705 | 0.69 | 0.87 | 0.99 | 0.108 |
| 2016 (0.1%): | HF705 | 0.66 | 0.86 | 0.99 | 0.108 |
| 2016 (0.2%): | HF705 | 0.66 | 0.87 | 0.99 | 0.108 |
| 2016 (0.3%): | HF705 | 0.68 | 0.85 | 0.97 | 0.108 |
| 2016 (0.4%): | HF705 | 0.68 | 0.85 | 0.97 | 0.107 |

[1]TAPPI test method T271pm-91.

TABLE 12

Hardwood (Aspen) Kraft Pulp Cooks Using Blends.

| Blend | H-factor | Kappa num. | Yield, % | Reject, % | Brightness, % |
|---|---|---|---|---|---|
| #78 (0.2%); | 853 | 18.17 | 53.3 | 2.2 | 31.4 |
| 2006 + 2066 | 705 | 18.6 | 52.72 | 3.04 | 31.8 |
| #79 (0.2%): | 853 | 17.67 | 50.3 | 4.15 | 30.76 |
| 2000 + 2054 | 705 | 17.7 | 52.5 | 3.3 | 30.8 |
| #80 (0.1%): | 853 | 20 | 52.95 | 2.32 | 30.93 |
| 2006 + 4NHMP | 705 | 21.3 | 52.63 | 2.63 | 31 |
| #81 (0.1%): | 853 | 18.2 | 54.18 | 1.48 | 32.9 |
| 2010 + 2066A | 705 | 20.5 | 53 | 2.48 | 31.5 |
| #82 (0.1%): | 853 | 18.2 | 53.3 | 1.72 | 32.7 |
| 2010 + 2054 | 705 | 18.3 | 50.86 | 3.31 | 33.3 |
| #83A (0.2%): | 853 | 15.3 | 54.07 | 1.48 | 33.7 |
| 2016 + 4NHMP (2:1) | 705 | 17.6 | 52.7 | 2.17 | 33.5 |
| #83B (0.2%): | 853 | 16.68 | 52.5 | 2.61 | 35.15 |
| 2016 + 4NHMP (1:2) | 705 | 17.6 | 51.26 | 4.68 | 35.9 |
| #84 (0.2%): | 853 | 16.7 | 52.7 | 1.57 | 31.4 |
| 2054 + 4NHMP | 705 | 17.87 | 52.5 | 2.5 | 31.1 |
| #85 (0.2%); | 853 | 14.96 | 52.7 | 2.01 | 35.2 |
| 2010 + 2000 | 705 | 16.8 | 52.6 | 2.72 | 34.4 |
| #86 (0.1%): | 853 | 18.8 | 52.4 | 1.63 | 29.9 |
| 4NHMP + 2066A | 705 | 20.3 | 50.2 | 3.75 | 29.3 |
| #87 (0.1%): | 853 | 19.06 | 53.1 | 1.5 | 32.1 |
| 2054 + 2066A | 705 | 19.9 | 50.4 | 7.08 | 33.5 |
| #94 (0.2%): | 853 | 16.46 | 51.4 | 4.45 | — |
| 2046 + 2006 | 705 | 19.85 | 52.37 | 4.64 | — |
| #95 (0.2%): | 853 | 15.89 | 52.02 | 2.42 | — |
| 2046 + 2016 | 705 | 17.16 | 52.28 | 4.75 | — |
| #96 (0.2%): | 853* | 15.75 | 51.06 | 4.92 | — |
| 2046 + 2054 | 705* | 17.28 | 49.14 | 9.19 | — |
| #97 (0.2%): | 853* | 16.81 | 48.82 | 8.37 | — |

TABLE 12-continued

Hardwood (Aspen) Kraft Pulp Cooks Using Blends.

| Blend | H-factor | Kappa num. | Yield, % | Reject, % | Brightness, % |
|---|---|---|---|---|---|
| 2046 + 2066A | 705* | 18.15 | 48.32 | 10.41 | — |
| #98 (0.2%): | 853 | 15.1 | 49.4 | 2.98 | — |
| 2046 + 4NHMP | 705 | 17.04 | 50.1 | 3.85 | — |
| Control: | 853 | 23.87 | 52.45 | 3.7 | 28.7 |
| | 705 | 25.2 | 49.84 | 5.5 | 28.3 |

*airdried chips were used instead of undried chips; other conditions the same.

Example 10

A series of Kraft cooks were performed on undried hardwood (aspen) wood chips according to the procedure described in the Pulping Description section of the Examples using either no phosphonate (control) or using Dequest 2046 at 0.2 wt. % concentration. The pulp was recovered and tested and the results presented in Table 13.

The data in Table 13 demonstrates that Dequest 2046 produced pulps with lower kappa number and higher brightness. Dequest 2046 also produced pulp with comparable or higher yield depending on the H-factor used. In addition, Dequest 2046 had lower % reject than the control.

Example 11

A series of Kraft cooks were performed on undried hardwood (aspen) wood chips according to the procedure described in the Pulping Description section of the Examples using either no phosphonate (control) or using compound 4NHMP or Blend 83B at 0.2 wt. % concentration. The pulp was recovered and tested and the results presented in Table 14.

The data in Table 14 demonstrates that compound 4NHMP and Blend 83B produced pulps with higher brightness. Compound 4NHMP and Blend 83B also produced pulp with comparable or higher tensile strength depending on the H-factor used.

TABLE 13

Hardwood (Aspen) Kraft Pulp Cooks Using Dequest 2046

| | H-factor | Kappa num. | Yield, % | Reject, % | Brightness, % |
|---|---|---|---|---|---|
| D2046 | 853 | 18.7 | 52.4 | 3.27 | 29.8 |
| (0.2%): | 705 | 18.8 | 51.86 | 4.2 | 30.2 |
| Control: | 853 | 23.87 | 52.45 | 3.7 | 28.7 |
| | 705 | 25.2 | 49.84 | 5.5 | 28.3 |

TABLE 14

Hardwood (Aspen) Physical Property Testing

| | Control | | Blend 83B (0.2%) | | 4NHMP (0.2%) | |
|---|---|---|---|---|---|---|
| H-factor | 853 | 705 | 853 | 705 | 853 | 705 |
| Basic weight, g/m^2 | 61.51 | 61.65 | 61.67 | 62.15 | 61.14 | 61.27 |
| Bulk, cm^3/g | 2.015 | 1.96 | 2.107 | 2.064 | 2.121 | 2.046 |
| Brightness, % | 28.2 | 27.5 | 34.5 | 34.8 | 34.3 | 34.3 |
| Tensile index, Nm/g | 23.97 | 23.14 | 23.95 | 23.77 | 23.33 | 25.08 |

TABLE 14-continued

Hardwood (Aspen) Physical Property Testing

| | Control | | Blend 83B (0.2%) | | 4NHMP (0.2%) | |
|---|---|---|---|---|---|---|
| Burst index, Pa · m^2/g | 0.905 | 0.901 | 0.855 | 0.919 | 0.858 | 0.82 |
| Tear index, nM · m^m2/g | 4.64 | 4.95 | 4.62 | 5.08 | 4.95 | 4.73 |

Example 12

Kraft cooks were performed on undried hardwood (aspen) wood chips according to the procedure described in the Pulping Description section of the Examples using either no phosphonate (control) or using Dequest 2066 at 0.2 wt. % concentration. The pulp was recovered and tested and the results presented in Table 15. The pulp was then bleached using a DEDED sequence as described in the Bleaching Description section of the Examples using the conditions set forth in Table 15. The bleached pulp was tested during and at the end of the bleaching sequence and the results presented in Table 15.

The data in Table 15 demonstrates that Dequest 2066 produced pulps with higher initial brightness and lower kappa number. Dequest 2066 also produced final bleached pulp with higher viscosity and comparable final brightness (Series #1 v. Series #2).

Example 13

Kraft cooks were performed on undried hardwood (aspen) wood chips according to the procedure described in the Pulping Description section of the Examples using either no phosphonate (control) or using Dequest 2066 at 0.2 wt. % concentration. The pulp was recovered and tested and the results presented in Table 16. The pulp was then bleached using a DEopD sequence as described in the Bleaching Description section of the Examples using the conditions set forth in Table 16. The bleached pulp was tested during and at the end of the bleaching sequence and the results presented in Table 16.

The data in Table 16 demonstrates that Dequest 2066 produced pulps with higher initial brightness and lower kappa number. Dequest 2066 produced bleached pulp with higher viscosity and higher brightness after the DEop stage (Series #3 v. Series #6). Dequest 2066 also produced final bleached pulp with higher viscosity, higher yield and higher brightness (Series #4 v. Series #7).

TABLE 15

Hardwood (Aspen) DEDED Bleaching

| | HW-Control | HW-2066 (0.2%) |
|---|---|---|
| Initial Kappa number | 15.2 | 13.9 |
| Initial Brightness, % | 31.4 | 33.9 |
| Initial Freeness @20° C., ml | 665 | 670 |
| General conditions | | |
| Consistency | 10% | |
| Temperature | 70° C. | |
| D1 | | |
| $ClO_2$, % on OD pulp | 1 | 1 |
| Time, min | 150 | 150 |
| pH: Initially | 3.4 | 3.5 |

TABLE 15-continued

Hardwood (Aspen) DEDED Bleaching

| | HW-Control | HW-2066 (0.2%) |
|---|---|---|
| End | 2.69 | 2.52 |
| Residual $ClO_2$, g/l | ND | ND |
| Brightness D | — | — |
| E | | |
| pH: Initially | 12.44 | 12.47 |
| End | 12.2 | 12.24 |
| Brightness DE | — | — |
| D2 | | |
| $ClO_2$, % on OD pulp | 1 | 1 |
| Time, min | 90 | 90 |
| End pH | 2.48 | 2.46 |
| Residual $ClO_2$, g/l | >0.02 | >0.02 |
| Brightness DED | — | — |
| E | | |
| pH: Initially | 12.42 | 12.48 |
| End | 12.2 | 12.17 |
| Brightness DEDE | — | — |
| D3 | | |
| $ClO_2$, % on OD pulp | 0.5 | 0.5 |
| Time, min | 90 | 90 |
| End pH | 4.04 | 4.08 |
| Residual $ClO_2$, g/l | 0.067 | 0.078 |
| Yield, %/Series # | 96.8 (#1) | 96 (#2) |
| Final brightness, % | 91.2 | 91.5 |
| Freeness @20° C., ml | 667 | 685 |
| Viscosity, cP | 20.3 | 21.1 |

1. Each experiment was conducted on a 30-g-OD-pulp scale
2. E stages: 2% NaOH, Time 60 min
3. ND: Not detectable
4. —: Not determined

TABLE 16

Hardwood (Aspen) DEopD

| | HW-Control | HW-2066 (0.2%) |
|---|---|---|
| Initial Kappa number | 15.2 | 14.2 |
| Initial Brightness, % | 31.4 | 32.1 |
| Initial Freeness @20° C., ml | 665 | 663 |
| General conditions | | |
| Consistency | 10% | |
| Temperature | D: 70° C.; Eop: 88° C. | |
| D1 | | |
| $ClO_2$, % on OD pulp | 1 | 1 |
| Time, min | 90 | 90 |
| End pH | 2.78 | 2.5 |
| Residual $ClO_2$, g/l | 0.014 | 0.01 |
| Brightness D | — | — |
| $E_{op}$ | | |
| Conditions | NaOH 3%; $MgSO_4$: 0.1%; $H_2O_2$: 1%; $O_2$ pressure: 100 psi; Time 60 min | |
| pH: Initially | 11.8 | 12.1 |
| End | 11.6 | 11.5 |
| Residual $H_2O_2$, g/l | 0.03 | 0.05 |
| Brightness $DE_{op}$., % | (Series #3) 81.8 | (Series #6) 83.5 |
| Kappa no | 2.5 | 2.35 |
| Viscosity, cP | 13.6 | 14.3 |
| Yield, % | 96.2 | 95.9 |

TABLE 16-continued

| Hardwood (Aspen) DEopD | HW-Control | HW-2066 (0.2%) |
|---|---|---|
| D2 | | |
| $ClO_2$, % on OD pulp | 0.6 | 0.6 |
| Time, min | 90 | 90 |
| End pH | 3.52 | 3.36 |
| Residual $ClO_2$, g/l | >0.015 | 0.06 |
| Total yield, %/Series # | (#4) | (#7) |
| | 94.6 | 95.4 |
| Final brightness, % | 92.2 | 92.77 |
| Freeness @20° C., ml | 645 | 645 |
| Viscosity, cP | 13.4 | 14 |

1. D stages were conducted on a 60 g-OD-pulp scale; $E_{op}$ on a 240 g scale
2. —: Not determined

Example 14

Kraft cooks were performed on undried hardwood (aspen) wood chips according to the procedure described in the Pulping Description section of the Examples using either no phosphonate (control) or using Dequest 2066 at 0.2 wt. % concentration. The pulp was recovered and tested and the results presented in Table 17. The pulp was then bleached using a DEopP sequence as described in the Bleaching Description section of the Examples using the conditions set forth in Table 17. The bleached pulp was tested during and at the end of the bleaching sequence and the results presented in Table 17.

The data in Table 17 demonstrates that Dequest 2066 produced pulps with higher initial brightness and lower kappa number. Dequest 2066 produced bleached pulp with higher viscosity and higher brightness after the DEop stage (Series #3 v. Series #6). Dequest 2066 also produced final bleached pulp with higher viscosity and higher brightness (Series #5 v. Series #8).

Example 15

Kraft cooks were performed on undried hardwood (aspen) wood chips according to the procedure described in the Pulping Description section of the Examples using either no phosphonate (control) or using Dequest 2066 at 0.2 wt. % concentration. The pulp was recovered and tested and the results presented in Table 18. The pulp was then bleached using a DED and DEDED sequence as described in the Bleaching Description section of the Examples using the conditions set forth in Table 18. The bleached pulp was tested during and at the end of the bleaching sequence and the results presented in Table 18.

The data in Table 18 demonstrates that Dequest 2066 produced pulps with higher initial brightness and lower kappa number. Dequest 2066 produced bleached pulp with higher viscosity and higher brightness after the DED stage (Series #9 v. Series #10). Dequest 2066 also produced final bleached pulp with higher viscosity, higher yield and higher brightness (Series #11 v. Series #12).

TABLE 17

| Hardwood (Aspen) DEopP Bleaching | HW-Control | HW-2066 (0.2%) |
|---|---|---|
| Initial Kappa number | 15.2 | 14.2 |
| Initial Brightness, % | 31.4 | 32.1 |
| Initial Freeness @20° C., ml | 665 | 663 |

TABLE 17-continued

| Hardwood (Aspen) DEopP Bleaching | HW-Control | HW-2066 (0.2%) |
|---|---|---|
| General conditions | | |
| Consistency | 10% | |
| Temperature | D: 70° C.; Eop: 88° C. | |
| D1 | | |
| $ClO_2$, % on OD pulp | 1 | 1 |
| Time, min | 90 | 90 |
| End pH | 2.78 | 2.5 |
| Residual $ClO_2$, g/l | 0.014 | 0.01 |
| Brightness D | — | — |
| $E_{op}$ | | |
| Conditions | NaOH: 3%; $MgSO_4$: 0.1%; $H_2O_2$: 1%; $O_2$ pressure: 100 psi; Time 60 min | |
| pH: Initially | 11.8 | 12.1 |
| End | 11.6 | 11.5 |
| Residual $H_2O_2$, g/l | 0.03 | 0.05 |
| Brightness $DE_{op}$., % | 81.8 | 83.5 |
| | (#3) | (#6) |
| Kappa no | 2.5 | 2.35 |
| Viscosity, cP | 13.6 | 14.3 |
| Yield, % | 96.2 | 95.9 |
| P | | |
| Conditions | NaOH: 2%; $MgSO_4$: 0.1%; $Na_2SiO_3$: 1.5%; Temperature: 86°-87° C.; Time: 120 min | |
| $H_2O_2$, % on OD pulp | 1 | 1 |
| pH: Initially | 11.98 | 12.71 |
| End | 11.34 | 12.25 |
| Residual $H_2O_2$, g/l | 0.05 | 0.37 |
| Total yield, %/Series # | 96.1 | 95.5 |
| | (#5) | (#8) |
| Final brightness, % | 87.3 | 95.5 |
| Freeness @20° C., ml | 640 | 630 |
| Viscosity, cP | 10.9 | 12 |

1. D stage was conducted on a 60 g-OD-pulp scale; Eop on a 240 g scale; and P stage on a 30 g-OD-pulp scale
2. —: Not determined.

TABLE 18

| Hardwood (Aspen) DEDED Bleaching | | HW-Control | HW-2066 (0.2%) |
|---|---|---|---|
| Sequence | Initial Kappa number | 15.2 | 14.2 |
| | Initial Brightness, % | 31.4 | 32.1 |
| | Initial Freeness @20° C., ml | 665 | 663 |
| | General conditions | | |
| | Consistency | 10% | |
| | Temperature | 70° C. | |
| | D1 | | |
| | $ClO_2$, 2% on OD pulp | 1 | 1 |
| | Time, min | 150 | 150 |
| | End pH | 279 | 2.53 |
| | Residual $ClO_2$, g/l | 0.004 | 0.004 |
| | Brightness D | — | — |

TABLE 18-continued

| | Hardwood (Aspen) DEDED Bleaching | HW-Control | HW-2066 (0.2%) |
|---|---|---|---|
| | E | | |
| | End pH | 12.25 | 12.23 |
| | Brightness DE | — | — |
| DED | D2 | | |
| | $ClO_2$, 2% on OD pulp | 1 | 1 |
| | Time, min | 90 | 90 |
| | End pH | 2.47 | 2.61 |
| | Residual $ClO_2$, g/l | 0.027 | 0.03 |
| | Yield, % | 97.7 | 98.4 |
| | Freeness, ml | 670 | 668 |
| | Brightness DED., %/Series # | 85.2 (#9) | 85.7 (#10) |
| | Viscosity, cP | 21.1 | 22.2 |
| DEDED | E | | |
| | End pH | 12.32 | 12.43 |
| | Brightness DEDE | — | — |
| | D3 | | |
| | $ClO_2$, 2% on OD pulp | 0.25 | 0.25 |
| | Time, min. | — | 90 |
| | End pH | 4.78 | 4.73 |
| | Residual $ClO_2$, g/l | 0.04 | 0.054 |
| | Yield %/Series # | 96.9 (#11) | 97.4 |
| | Final Brightness, % | 90.3 | 91.7 |
| | Freeness @20° C., ml | 680 | 670 |
| | Viscosity, cP | 20 | 20.8 |

Note:
1. Each experiment was conducted on a 30-g-OD-pulp scale
2. E stages: 2% NaOH, Time 60 min
3. —: Not determined.

Example 16

Kraft cooks were performed on undried softwood (pine) wood chips according to the procedure described in the Pulping Description section of the Examples using either no phosphonate (control) or using Dequest 2006 at 0.2 wt. % concentration. The pulp was recovered and tested and the results presented in Table 19. The pulp was then bleached using a DEDED sequence as described in the Bleaching Description section of the Examples using the conditions set forth in Table 19. The bleached pulp was tested during and at the end of the bleaching sequence and the results presented in Table 19.

The data in Table 19 demonstrates that Dequest 2006 produced bleached pulp with higher viscosity, higher yield and higher brightness (Series #13 v. Series #14) even though the initial brightness and kappa numbers prior to bleaching were only slightly improved.

Example 17

Handsheets were prepared from the bleached pulps of Examples 12, 13, 15 and 16 and strength properties were determined. The results are presented in Table 20. In addition to the improvements in brightness and viscosity obtained from the bleached pulp of the invention, the overall strength of the handsheets produced from bleached pulp of the invention are improved compared to the control bleached pulp.

Example 18

The fiber length of the bleached pulps of Examples 12–16 was determined using the Kajaani fiber length method and the results are presented in Table 21.

TABLE 19

| Softwood (Pine) DEDED Bleaching | SW-Control | SW-2006 (0.2%) |
|---|---|---|
| Initial Kappa number | 23.9 | 23.8 |
| Initial Brightness, % | 28.8 | 29.5 |
| Initial Freeness @20° C., ml | 695 | 680 |
| General Conditions | | |
| Consistency | 10% | |
| Temperature | 70°-72° C. | |
| D1 | | |
| $ClO_2$, % on OD pulp | 1.5 | 1.5 |
| Time, min | 90 | 90 |
| End pH | 2.24 | 2.2 |
| Residual $ClO_2$, g/l | 0.004 | 0.0067 |
| Brightness D | | |
| E | | |
| End pH | 12.29 | 12.11 |
| Brightness DE | — | — |
| D2 | | |
| $ClO_2$, % on OD pulp | 1 | 1 |
| Time, min | 90 | 90 |
| End pH | 2.37 | 2.41 |
| Residual $ClO_2$, g/l | 0.007 | 0.013 |
| E | | |
| End pH | 12.05 | 12.26 |
| Brightness DEDE | — | — |
| D3 | | |
| $ClO_2$, % on OD pulp | 0.5 | 0.5 |
| Time, min | 120 | 120 |
| End pH | 3.27 | 3.34 |
| Residual $ClO_2$, g/l | 0.034 | 0.047 |
| Yield, %/Series # | 96.2 (#13) | 96.7 (#14) |
| Final brightness, % | 89.6 | 90.7 |
| Freeness @20° C., ml | 700 | 700 |
| Viscosity, cP | 17 | 17.6 |

Note:
1. Each experiment was conducted on a 30-g-OD-pulp scale
2. E stages: 2% NaOH, Time 60 min
3. —: Not determined.

TABLE 20

Handsheet Strength Data For Bleached Pulps Without Beating

| | Hardwood | | Hardwood | | Hardwood | | Hardwood | |
|---|---|---|---|---|---|---|---|---|
| | Sequences | | | | | | | |
| | DEDED | | $DE_{op}$ | | $DE_{op}D$ | | DED | |
| | Series no. | | | | | | | |
| | #1 | #2 | #3 | #6 | #4 | #7 | #9 | #10 |
| | Pulp type | | | | | | | |
| | Control | 2066 (0.2%) | Control | 2066 (0.2%) | Control | 2066 (0.2%) | Control | 2066 (0.2%) |
| Ini. Kappa no. | 15.2 | 13.9 | 15.2 | 14.2 | 15.2 | 14.2 | 15.2 | 14.2 |
| Ini. Brightness, % | 31.4 | 33.9 | 31.4 | 32.1 | 31.4 | 32.1 | 31.4 | 32.1 |
| Ini. Viscosity, cP | 25.8 | 26.4 | 25.8 | 26.9 | 25.8 | 26.9 | 25.8 | 26.9 |
| Basic weight, g/m^2 | 62.72 | 61.12 | 60.33 | 60.44 | 61.98 | 61.61 | 61.35 | 61.68 |
| Bulk, cm^3/g | 2 | 2 | 2.11 | 1.98 | 2.18 | 2.01 | 2.286 | 2.281 |
| Tensile Index, N*m/g | 18.6 | 21 | 18.7 | 21.63 | 17 | 19.27 | 15.08 | 15.21 |
| Burst Index, kPa*m^2/g | 0.66 | 0.73 | 0.67 | 0.7 | <0.56 | 0.663 | 0.4 | 0.5 |
| Tear Index, mN*m^2/g | 4.13 | 4.37 | 4.07 | 4.41 | 3.59 | 4.23 | 3.07 | 3.58 |
| Brightness, % | 91.2 | 91.5 | 81.8 | 83.5 | 92.2 | 92.77 | 85.2 | 85.7 |
| Final Viscosity, cP | 20.3 | 21.1 | 13.6 | 14.3 | 13.4 | 14 | 21.1 | 22.2 |

| | Hardwood | | Softwood | | Hardwood | |
|---|---|---|---|---|---|---|
| | Sequences | | | | | |
| | DEDED | | DEDED | | $DE_{op}P$ | |
| | Series no. | | | | | |
| | #11 | #12 | #13 | #14 | #5 | #8 |
| | Pulp type | | | | | |
| | Control | 2066 (0.2%) | Control | 2066 (0.2%) | Control | 2066 (0.2%) |
| Ini. Kappa no. | 15.2 | 14.2 | 23.9 | 23.8 | 15.2 | 14.2 |
| Ini. Brightness, % | 31.4 | 32.1 | 28.8 | 29.5 | 31.4 | 32.1 |
| Ini. Viscosity, cP | 25.8 | 26.9 | 20.8 | 21.1 | 25.8 | 26.9 |
| Basic weight, g/m^2 | 61.36 | 60.83 | 61.25 | 60.84 | 60.26 | 62.02 |
| Bulk, cm^3/g | 2.229 | 2.231 | 2.221 | 2.184 | 2.108 | 1.981 |
| Tensile Index, N*m/g | 14.32 | 15.04 | 28.37 | 29.5 | 17.77 | 21.01 |
| Burst Index, kPa*m^2/g | 0.5 | 0.56 | 1.85 | 1.97 | 0.652 | 0.74 |
| Tear Index, mN*m^2/g | 3.48 | 3.86 | 20.37 | 20.62 | 3.85 | 4.47 |
| Brightness, % | 90.3 | 91.7 | 89.6 | 90.7 | 84.7 | 85.4 |
| Final Viscosity, cP | 20 | 20.8 | 17 | 17.6 | 10.9 | 12 |

TABLE 21

Kajaani Fiber Length Testing On Bleaching Pulps

| | Arithmetic mm | L weighted mm | W weighted mm | Coarse-ness mg/m | Series no. |
|---|---|---|---|---|---|
| HW-DEDED (1%-1%-0.5%): | | | | | |
| Control | 0.57 | 0.78 | 0.92 | 0.114 | #1 |
| 2066 (0.2%) | 0.63 | 0.81 | 0.94 | 0.114 | #2 |
| HW-$DE_{op}$ (1%-P1%): | | | | | |
| Control | 0.54 | 0.74 | 0.88 | 0.113 | #3 |
| 2066 (0.2%) | 0.55 | 0.76 | 0.92 | 0.114 | #6 |
| HW-$DE_{op}D$ (1%-P1%-0.6%): | | | | | |
| Control | 0.54 | 0.74 | 0.88 | 0.115 | #4 |
| 2066 (0.2%) | 0.54 | 0.75 | 0.89 | 0.117 | #7 |
| HW-$DE_{op}P$ (1%-P1%-P1%): | | | | | |
| Control | 0.54 | 0.74 | 0.88 | 0.122 | #5 |
| 2066 (0.2%) | 0.54 | 0.74 | 0.87 | 0.117 | #8 |
| HW-DED (1%-1%): | | | | | |
| Control | 0.59 | 0.79 | 0.92 | 0.108 | #9 |
| 2066 (0.2%) | 0.59 | 0.79 | 0.93 | 0.108 | #10 |
| HW-DEDED (1%-1%-0.25%): | | | | | |
| Control | 0.58 | 0.77 | 0.9 | 0.109 | #11 |
| 2066 (0.2%) | 0.58 | 0.77 | 0.91 | 0.109 | #12 |
| SW-DEDED (1%-1%-0.5%): | | | | | |
| Control | 1.42 | 2.23 | 2.7 | 0.194 | #13 |
| 2066 (0.2%) | 1.48 | 2.24 | 2.71 | 0.192 | #14 |

HW—hardwood (aspen)
SW—softwood (red pine)

Example 19

Kraft cooks were performed on undried softwood (pine) wood chips according to the procedure described in the Pulping Description section of the Examples using either no phosphonate (control) or using Dequest 2006 or Blend 78 at 0.2 wt. % concentration. The pulp was recovered and tested and the results presented in Table 22. The pulp was then bleached using a DEDED sequence as described in the Bleaching Description section of the Examples using the conditions set forth in Table 22. The bleached pulp was tested during and at the end of the bleaching sequence and the results presented in Table 22.

The data in Table 22 demonstrates that Dequest 2006 and Blend 78 produced pulps with higher initial brightness, and Blend 78 produced pulp with higher initial viscosity and lower kappa number. Dequest 2006 and Blend 78 produced bleached pulp after the DED and DEDE stages that exhibited higher brightness. Dequest 2006 and Blend 78 also produced final bleached pulp with higher viscosity and final brightness.

Example 20

Kraft cooks were performed on undried softwood (aspen) wood chips according to the procedure described in the Pulping Description section of the Examples using either no phosphonate (control) or using Dequest 2006 or Blend 78 at 0.2 wt. % concentration. The pulp was recovered and tested and the results presented in Table 23. The pulp was then bleached using a DEopD and DEopP sequences as described in the Bleaching Description section of the Examples using the conditions set forth in Table 22. The bleached pulp was tested after the DEop stage and at the end of the DEopD and DEopP bleaching sequences and the results presented in Table 23.

The data in Table 23 demonstrates that Dequest 2006 and Blend 78 produced pulps with higher initial brightness, and Blend 78 produced pulp with lower kappa number. Dequest 2006 and Blend 78 produced bleached pulp with higher brightness after the DEop stage. Dequest 2006 and Blend 78 produced final bleached pulp with higher yield and higher brightness after both the DEopD and DEopP bleaching sequences.

Example 21

The bleached pulps of Example 19 were tested for Kajaani fiber length and physical properties and the results are presented in Table 24.

The data in Table 24 demonstrates that Dequest 2006 and Blend 78 produced pulps with higher final brightness and improved strength properties.

TABLE 22

Softwood (Pine) DEDED Bleach Sequences

I. Conditions:

| Stage | D1 | E1 | D2 | E2 | D3 |
|---|---|---|---|---|---|
| Time, min | 90 | 60 | 90 | 60 | 120 |
| Temp., ° C. | 70 | 70 | 70 | 70 | 70 |
| Consistency, % | 10 | 10 | 10 | 10 | 10 |

II. Results:

| | Non-adjusted pH | | |
|---|---|---|---|
| | Control | 2006 (0.2%) | Blend 78 (0.2%) |
| Ini. Kappa number | 24.5 | 24.3 | 24.05 |
| Ini. Viscosity, cP | 21.96 | 21.02 | 22.27 |

TABLE 22-continued

Softwood (Pine) DEDED Bleach Sequences

| | | | | |
|---|---|---|---|---|
| Ini. Brightness, % | | 29.3 | 30.4 | 30.6 |
| D1: | $ClO_2$ applied, % | 1.5 | 1.5 | 1.5 |
| | NaOH applied, % | 0 | 0 | 0 |
| | $ClO_2$ residual, g/l | ND | ND | ND |
| | End pH | 1.45 | 1.47 | 1.48 |
| E1: | NaOH applied, % | 2 | 2 | 2 |
| | End pH | 11.96 | 11.91 | 11.82 |
| D2: | $ClO_2$ applied, % | 0.8 | 0.8 | 0.8 |
| | NaOH applied, % | 0 | 0 | 0 |
| | $ClO_2$ residual, g/l | ~0.006 | 0.006 | 0.006 |
| | End pH | 2.2 | 2.19 | 2.17 |
| DED: | Yield, % | 98.2 | 98.7 | 98.3 |
| | Brightness, % | 62.6 | 64.5 | 66.8 |
| E2: | NaOH applied, % | 2 | 2 | 2 |
| | End pH | 12.04 | 12.03 | 12.02 |
| DEDE: | Yield, % | 96.3 | 96 | 96.2 |
| | Brightness, % | 67.1 | 67.7 | 70.3 |
| D3: | $ClO_2$ applied, % | 0.4 | 0.4 | 0.4 |
| | NaOH applied, % | 0 | 0 | 0 |
| | $ClO_2$ residual, g/l | 0.006 | ~0.009 | 0.009 |
| | End pH | 2.96 | 2.89 | 2.78 |
| DEDE: | Yield, % | 94.6 | 95.3 | 95 |
| | Brightness, % | 87.4 | 88.4 | 88.6 |

TABLE 23

Softwood (Pine)-$DE_{op}D/DE_{op}P$ Bleaching

I. Conditions:

| Stage | D1 | *Eop | D2/**P |
|---|---|---|---|
| Time, min | 90 | 50 at 80-90° C. | 120/150 |
| Temp., ° C. | 70 | 90 | 85-87 |
| Cons., % | 10 | 10 | 10 |

II. Results:

| | | Control | 2006 (0.2%) | Blend 78 (0.2%) |
|---|---|---|---|---|
| Initial Kappa No. | | 24.5 | 24.3 | 24.05 |
| Initial Brightness, % | | 29.3 | 30.4 | 30.6 |
| D1: | $ClO_2$ , % | 1.5 | 1.5 | 1.5 |
| | Residual, g/l | 0.003 | 0.003 | 0.003 |
| | End pH | 1.91 | 1.88 | 1.81 |
| Eop: | NaOH, % | 3 | 3 | 3 |
| | $H_2O_2$, % | 0.5 | 0.5 | 0.5 |
| | Residual, g/l | 0.031 | 0.046 | 0.107 |
| | End pH | 11.91 | 11.92 | 11.98 |
| DEop: | Brightness, % | 61.8 | 63.9 | 64.55 |
| D2: | ClO, % | 0.8 | 0.8 | 0.8 |
| | Residual, g/l | ND | 0.003 | 0.003 |
| | Yield, % | 94.7 | 96.3 | 95.6 |
| | End pH | 2.09 | 2.1 | 2.04 |
| DEop D: | Brightness, % | 81.4 | 82.8 | 83.5 |
| P: | $H_2O_2$, % | 1 | 1 | 1 |
| | Residual, g/l | 0.042 | 0.092 | 0.046 |
| | End pH | 11.76 | 11.76 | 11.62 |
| | Yield, % | 94.3 | 94.7 | 95.8 |
| DEop P: | Brightness, % | 74.5 | 76.9 | 79.1 |

Note:
*$O_2$ pressure 40 psi $MgSO_4$-0.1%;
**$Na_2SiO_3$-1.59%, $MgSO_4$-0.1%, NaOH-2%

TABLE 24

Kajaani Fiber Lengths and Physical Properties - Softwood (Pine) DEDED Bleaching

| | Control: | | 2006 (0.2%) | | Blend 78 (0.2%) | |
|---|---|---|---|---|---|---|
| | Original: | DEDED: | Original: | DEDED: | Original: | DEDED: |
| | | | Fiber Lengths: | | | |
| Arithmetic Ave, mm | 1.62 | 1.55 | 1.62 | 1.55 | 1.63 | 1.52 |
| L weighted Ave, mm | 2.35 | 2.28 | 2.32 | 2.23 | 2.32 | 2.21 |
| W weighted Ave, mm | 2.8 | 2.74 | 2.77 | 2.67 | 2.77 | 2.66 |
| Coarseness, mg/m | 0.19 | 0.183 | 0.191 | 0.188 | 0.193 | 0.188 |
| | | | Physical lengths: | | | |
| Basic Weight, g/m2 | 61.1 | 61.46 | 60.84 | 61.25 | 60.75 | 61.07 |
| Bulk, cm3/g | 2.46 | 2.29 | 2.3 | 2.28 | 2.28 | 2.19 |
| Brightness % | 29.3 | 82.6 | 30.4 | 83.1 | 30.6 | 83.3 |
| Tensile index, Nm/g | 23.36 | 25.87 | 26.82 | 26.74 | 34.65 | 29.41 |
| Burst index, kPa · m2/g | 1.128 | 1.638 | 1.539 | 1.93 | 1.7 | 2.12 |
| Tear index, mN· m2/g | 16.05 | 16.98 | 18.06 | 20.05 | 18.34 | 19.3 |

Example 22

Kraft cooks were performed on undried hardwood (aspen) wood chips according to the procedure described in the Pulping Description section of the Examples using either no phosphonate (control) or using Dequest 2016 at 0.2 wt. % concentration. The pulp was recovered and tested and the results presented in Table 25. The pulp was then bleached using a DEDED sequence (pH not adjusted) as described in the Bleaching Description section of the Examples using the conditions set forth in Table 25. In particular, the Dequest 2016 pulp was bleached with less $ClO_2$ during both the D1 and D2 stages. The bleached pulp was tested during and at the end of the bleaching sequence and the results presented in Table 25.

The data in Table 25 demonstrates that Dequest 2016 produced pulps with higher initial brightness and lower kappa number. Dequest 2016 also produced bleached pulp with higher brightness after the D1, E1, D2 and E2 stages and comparable final brightness. It is significant that the final brightness of the Dequest 2016 bleached pulp is slightly better than the control while less $ClO_2$ was used because use of less bleaching chemicals has commercial advantages, including lower AOX, biological oxygen demand (BOD), and chemical oxygen demand (COD) in the discharge from the bleach unit of the pulp mill.

TABLE 25

Hardwood (Aspen)-DEDED Bleaching (pH NOT adjusted)

| | | | | | |
|---|---|---|---|---|---|
| | | I. Conditions | | | |
| Stage | | D1 | E1 | D2 | E2 | D3 |
| Time, min | | 90 | 60 | 90 | 60 | 90 |
| Temp., ° C. | | 70 | 70 | 70 | 70 | 70 |
| Cons., % | | 10 | 10 | 10 | 10 | 10 |
| | | II. Results | | | | |
| H-Factor: HF846 | | | Control | 2016 (0.2%) | | |
| Initial Kappa No. | | | 22.5 | 16 | | |
| Initial Brightness, % | | | 29.2 | 34.4 | | |
| D1: | $ClO_2$ , % | | 1.3 | 1 | | |
| | Residual, g/l | | 0.006 | 0.0091 | | |
| | End pH | | 2.2 | 2.44 | | |
| | Brightness, % | | 43.98 | 51.44 | | |

TABLE 25-continued

Hardwood (Aspen)-DEDED Bleaching (pH NOT adjusted)

| | | | |
|---|---|---|---|
| E1: | NaOH, % | 2 | 2 |
| | End pH | 11.82 | 11.79 |
| | Brightness, % | 57.9 | 61.78 |
| D2: | $ClO_2$, % | 0.5 | 0.4 |
| | Residual, g/l | 0.006 | 0.004 |
| | End pH | 3 | 3.35 |
| | Brightness, % | 82.85 | 83.36 |
| E2: | NaOH, % | 2 | 2 |
| | End pH | 11.78 | 11.74 |
| | Brightness, % | 82.25 | 83.06 |
| D3: | $ClO_2$, % | 0.2 | 0.2 |
| | Residual, g/l | 0.036 | 0.036 |
| | End pH | 4.48 | 4.45 |
| | Brightness, % | 91.12 | 91.56 |

Example 23

Kraft cooks were performed on undried hardwood (aspen) wood chips according to the procedure described in the Pulping Description section of the Examples using either no phosphonate (control) or using Dequest 2016 at 0.2 wt. % concentration. The pulp was recovered and tested and the results presented in Table 26. The pulp was then bleached using a DEDED sequence (pH adjusted) as described in the Bleaching Description section of the Examples using the conditions set forth in Table 26. In particular, the Dequest 2016 pulp was bleached with less $ClO_2$ during both the D1 and D2 stages. The bleached pulp was tested during and at the end of the bleaching sequence and the results presented in Table 26.

The data in Table 26 demonstrates that Dequest 2016 produced pulps with higher initial brightness and lower kappa number. Dequest 2016 also produced bleached pulp with higher brightness after the D1, E1, D2 and E2 stages and comparable final brightness. It is significant that the final brightness of the Dequest 2016 bleached pulp is slightly better than the control while less $ClO_2$ was used because use of less bleaching chemicals has commercial advantages, including lower AOX, BOD, and COD in the discharge from the bleach unit of the pulp mill.

TABLE 26

| Hardwood-DEDED Bleaching (pH adjusted) | | | | | |
|---|---|---|---|---|---|
| I. Conditions | | | | | |
| Stage | D1 | E1 | D2 | E2 | D3 |
| Time, min | 90 | 60 | 90 | 60 | 90 |
| Temp., ° C. | 70 | 70 | 70 | 70 | 70 |
| NaOH added, 0.2% per % ClO2 | 0.2 | | 0.2 | | 0.2 |
| Cons., % | 10 | 10 | 10 | 10 | 10 |

| II. Results | | | |
|---|---|---|---|
| H-Factor: HF846 | | Control | 2016 (0.2%) |
| Initial Kappa No. | | 22.5 | 16 |
| Initial Brightness, % | | 29.2 | 34.4 |
| D1: | $ClO_2$ , % | 1.3 | 1 |
| | Residual, g/l | 0.006 | 0.006 |
| | End pH | 2.95 | 3.21 |
| | Brightness, % | 44.75 | 53.66 |
| E1: | NaOH, % | 2 | 2 |
| | End pH | 11.84 | 11.8 |
| | Brightness, % | 57.74 | 61.98 |
| D2: | $ClO_2$, % | 0.5 | 0.4 |
| | Residual, g/l | 0.067 | 0.085 |
| | End pH | 3.93 | 4.21 |
| | Brightness, % | 83.27 | 84.1 |
| E2: | NaOH, % | 2 | 2 |
| | End pH | 11.8 | 11.78 |
| | Brightness, % | 82.63 | 83.38 |
| D3: | $ClO_2$, % | 0.2 | 0.2 |
| | Residual, g/l | 0.07 | 0.073 |
| | End pH | 5.17 | 5.38 |
| | Brightness, % | 90.53 | 90.59 |

Example 24

Kraft cooks were performed on undried hardwood (aspen) wood chips according to the procedure described in the Pulping Description section of the Examples using either no phosphonate (control) or using Dequest 2016 at 0.2 wt. % concentration. The pulp was recovered and tested and the results presented in Table 27. The pulp was then bleached using a OPD sequence as described in the Bleaching Description section of the Examples using the conditions set forth in Table 27. The bleached pulp was tested during and at the end of the bleaching sequence and the results presented in Table 27.

The data in Table 27 demonstrates that Dequest 2016 produced pulps with higher initial brightness and lower kappa number. Dequest 2016 also produced bleached pulp with higher brightness after the O, P and D stages.

Example 25

Kraft cooks were performed on undried hardwood (aspen) wood chips according to the procedure described in the Pulping Description section of the Examples using either no phosphonate (control) or using Dequest 2016 at 0.2 wt. % concentration. The pulp was recovered and tested and the results presented in Table 28. The pulp was then bleached using a DEopD sequence as described in the Bleaching Description section of the Examples using the conditions set forth in Table 28. The bleached pulp was tested during and at the end of the bleaching sequence and the results presented in Table 28.

The data in Table 28 demonstrates that Dequest 2016 produced pulps with higher initial brightness and lower kappa number. Dequest 2016 also produced bleached pulp with significantly higher brightness after the D1, Eop, and D2 stages. It is particularly significant that the final brightness of the invention is 4.1% higher than the control as a brightness of 88.7 may enable elimination of additional bleaching steps to achieve an acceptable final brightness.

TABLE 27

| Hardwood (Aspen)-OPD Bleaching | | | |
|---|---|---|---|
| I. Conditions | | | |
| Stage | *O | **P | D |
| Time, min | 45@90° C. | 120 | 90 |
| Temp., ° C. | 90 | 85-87 | 70 |
| NaOH added, % | 2.5 | 2 | 0.3% per % $ClO_2$ |
| Cons., % | 15 | 10 | 10 |

| H-Factor: HF693 | | Control | 2016 (0.2%) |
|---|---|---|---|
| Initial Kappa No. | | 24.5 | 17.06 |
| Initial Brightness, % | | 28.3 | 35.2 |
| O: | End pH | 11.74 | 11.83 |
| | Kappa no. | 15.1 | 12.2 |
| | Brightness, % | 39.93 | 46.83 |
| P: | $H_2O_2$ applied % | 1.2 | 1.2 |
| | Residual, g/l | 0.0077 | 0.015 |
| | Kappa no. | 10.8 | 8.9 |
| | End pH | 11.65 | 11.64 |
| | Brightness, % | 54.62 | 59.6 |
| D: | $ClO_2$, % | 0.8 | 0.8 |
| | Residual, g/l | 0.012 | 0.079 |
| | End pH | 4.75 | 4.42 |
| | Brightness, % | 81.28 | 83.12 |

Note:
*$O_2$ pressure-90 psi, $MgSO_4$-0.1%;
**$MgSO_4$-0.1%, $Na_2SiO_3$-1.5%

TABLE 28

| Hardwood (Aspen)-DEopD Bleaching | | | |
|---|---|---|---|
| I. Conditions | | | |
| Stage | D1 | *Eop | D2 |
| Time, min | 90 | 50@80-90° C. | 90 |
| Temp., ° C. | 70 | 90 | 70 |
| Cons., % | | 10 | |

| II. Results | | | |
|---|---|---|---|
| H-Factor: HF693 | | Control | 2016 (0.2%) |
| Initial Kappa No | | 24.5 | 17.06 |
| Initial Brightness | | 28.3 | 35.2 |
| **D1: | $ClO_2$ , % | 1 | 1 |
| | Residual, g/l | 0.003 | 0.003 |
| | End pH | 3.72 | 3.53 |
| | Brightness, % | 38.4 | 53.81 |
| Eop: | NaOH, % | 3 | 3 |
| | $H_2O_2$, % | 0.5 | 0.5 |
| | Oxygen, psi | 30 | 30 |
| | Kappa number | 5.6 | 4.5 |
| | Residual, g/l | 0.046 | 0.118 |
| | End pH | 11.75 | 11.83 |
| | Brightness, % | 71.22 | 79.23 |
| D2: | $ClO_2$, % | 0.3 | 0.3 |
| | Residual, g/l | 0.006 | 0.006 |
| | End pH | 4.2 | 4.21 |
| | Brightness, % | 84.6 | 88.7 |

Note:
*$MgSO_4$-0.1%
**pH adjusted with NaOH of 0.4% per % $ClO_2$

Example 26

Kraft cooks were performed on undried hardwood (aspen) wood chips according to the procedure described in the Pulping Description section of the Examples using either no phosphonate (control) or using Dequest 2016 at 0.2 wt. % concentration. The pulp was recovered and tested and the results presented in Table 29. The pulp was then bleached using a DEopP sequence as described in the Bleaching Description section of the Examples using the conditions set forth in Table 29. The bleached pulp was tested during and at the end of the bleaching sequence and the results presented in Table 29.

The data in Table 29 demonstrates that Dequest 2016 produced pulps with higher initial brightness and lower kappa number. Dequest 2016 also produced bleached pulp with significantly higher brightness after the D1, Eop, and P stages.

Example 27

Kraft cooks were performed on undried hardwood (aspen) wood chips according to the procedure described in the Pulping Description section of the Examples using either no phosphonate (control) or using Dequest 2016 at 0.2 wt. % concentration at H-factors of 1000, 846, 693 and 539. The pulp was recovered and tested and the results presented in Table 30. Pulp from the H-factor 846 and 693 runs were then bleached using various bleaching sequences as described in the Bleaching Description section of the Examples using the conditions set forth in Tables 25–29. The viscosity of the bleached pulp was determined at the end of the bleaching sequence and the results presented in Table 30.

The data in Table 30 demonstrates that Dequest 2016 produced pulps with higher initial brightness, lower kappa number, lower reject, higher yield, and higher viscosity. Dequest 2016 also produced bleached pulp with higher viscosity after the bleach stages of DEDED, DEDED (pH adjusted), DEop, DEopD, DEopP, O, OP, and OPD for the H-factors tested. As such, the use of Dequest 2016 improved the pulps' response to bleaching sequences with respect to viscosity.

TABLE 29

Hardwood (Aspen)-DEopP Bleaching

| I. Conditions | Stage | D | *Eop | **P |
|---|---|---|---|---|
| | Time, min | 90 | 50@80-90° C. | 120 |
| | Temp., ° C. | 70 | 90 | 85-87 |
| | Cons., % | 10 | 10 | 10 |

| II. Results | H-Factor: HF693 | | Control | 2016(0.2%) |
|---|---|---|---|---|
| | Initial Kappa No. | | 24.5 | 17.06 |
| | Initial Brightness, % | 28.3 | 35.2 | |
| | ***D: | $ClO_2$ , % | 1 | 1 |
| | | Residual, g/l | 0.003 | 0.003 |
| | | End pH | 3.72 | 3.53 |
| | | Brightness, % | 38.4 | 53.81 |
| | Eop: | NaOH, % | 3 | 3 |
| | | $O_2$ pressure, psi | 30 | 30 |
| | | $H_2O_2$, % | 0.5 | 0.5 |
| | | Residual, g/l | 0.046 | 0.118 |
| | | Kappa number | 5.6 | 4.5 |
| | | End pH | 11.75 | 11.83 |
| | | Brightness, % | 71.22 | 79.23 |

TABLE 29-continued

Hardwood (Aspen)-DEopP Bleaching

| | | | |
|---|---|---|---|
| P: | $H_2O_2$, % | 0.6 | 0.6 |
| | Residual, g/l | 0.007 | 0.011 |
| | End pH | 11.66 | 11.71 |
| | Brightness, % | 79.5 | 83.43 |

Note:
*$MgSO_4$-0.1%
**$Na_2SiO_3$-1.5%, $MgSO_4$-0.1%, NaOH-2%
***pH adjusted with NaOH of 0.3% per % $ClO_2$

TABLE 30

Hardwood Kraft Pulping (Aspen)

| | H-factor: | | | | | | | |
|---|---|---|---|---|---|---|---|---|
| | HW-control | | | | HW-2016 (0.2%) | | | |
| | 1000 | 846 | 693 | 539 | 1000 | 846 | 693 | 539 |
| Kappa no. | 20.7 | 22.5 | 24.51 | 28 | 15.02 | 16.02 | 17.06 | 18.28 |
| Yield, % | 52.8 | 52.7 | 51.2 | 45.61 | 53.62 | 53.5 | 53.9 | 52.1 |
| Reject, % | 0.84 | 1.75 | 4.1 | 15.85 | 0.78 | 1.07 | 2.12 | 3.73 |
| Brightness, % | 30.6 | 29.2 | 28.2 | 28 | 35.5 | 34.4 | 35.2 | 35.1 |
| Viscosity: | 33.6 | 39.4 | 43.1 | 48.3 | 34.8 | 39.6 | 43.7 | 50.4 |
| DEDED | | 29.8 | | | | 30.6 | | |
| DEDED (pH) | | 27.7 | | | | 29.5 | | |
| Deop | | | 26.2 | | | | 28.4 | |
| DeopD | | | 25.7 | | | | 26.8 | |
| DeopP | | | 23.4 | | | | 24.7 | |
| O | | | 34.3 | | | | 35.2 | |
| OP | | | 28.1 | | | | 29.1 | |
| OPD | | | 26.7 | | | | 27.8 | |

Note:
1. See Tables 24-28 for bleaching sequences.
2. Other cooking conditions: AA18%, Sulfidity 25%, Highest temp. 170° C., Woodchip350 g OD/cook, Liquor: Woodchip ratio = 4:1.

Example 28

Kraft cooks were performed on undried hardwood (aspen) wood chips according to the procedure described in the Pulping Description section of the Examples using either Dequest 2016 at 0.1 wt. % concentration or using Dequest 2066 at 0.2 wt. % concentration. The pulp was recovered and tested and the results presented in Table 31. The pulp was then bleached using a DEDED sequence (pH adjusted) as described in the Bleaching Description section of the Examples using the conditions set forth in Table 31. The bleached pulps were tested during and at the end of the bleaching sequence and the results presented in Table 31.

The data in Table 31 demonstrates that Dequest 2016 and 2066 produced pulps with higher initial brightness and lower Kappa number. Dequest 2016 and 2066 also produced bleached pulp with higher brightness after the D1, E1, D2 and E2 stages and comparable final brightness. It is significant that the final brightness is comparable while less $ClO_2$ was used because use of less bleaching chemical has the aforementioned commercial advantages. Comparing Table 31 with Table 26, it is also shown that 0.2% Dequest 2016 produces brighter pulp than 0.1% Dequest 2016.

Example 29

Kraft cooks were performed on undried hardwood (aspen) wood chips according to the procedure described in the Pulping Description section of the Examples using either Dequest 2016 at 0.1 wt. % concentration or using Dequest 2066 at 0.2 wt. % concentration. The pulp was recovered and tested and the results presented in Table 32. The pulp was then bleached using a DEopD sequence as described in the Bleaching Description section of the Examples using the conditions set forth in Table 32. The bleached pulps were tested during and at the end of the bleaching sequence and the results presented in Table 32.

The data in Table 32 demonstrates that Dequest 2016 and 2066 produced pulps with higher initial brightness and lower Kappa number. Dequest 2016 and 2066 also produced bleached pulp with significantly higher brightness after each stage. It is significant that the final brightness of the invention is 3.9–4.1% higher than the control as a brightness of 88.5–88.7 may enable elimination of additional bleaching steps to achieve an acceptable final brightness. Comparing Table 32 with Table 28, it is also shown that 0.1% and 0.2% Dequest 2016 produce equivalent brightness.

TABLE 31

Hardwood (Aspen)-DEDED Bleaching (pH adjusted)

I. Conditions

| Stage | D1 | E1 | D2 | E2 | D3 |
|---|---|---|---|---|---|
| Time, min | 90 | 60 | 90 | 60 | 90 |
| Temp., ° C. | 70 | 70 | 70 | 70 | 70 |
| NaOH added, | 0.3 per % $ClO_2$ | 2 | 0.3 per % $ClO_2$ | 2 | 0 |
| Cons., % | 10 | 10 | 10 | 10 | 10 |

II. Results

| | | 2016 (0.1%) | 2066 (0.2%) | Control |
|---|---|---|---|---|
| Initial Kappa No. | | 18.1 | 18.57 | 22.5 |
| Initial Brightness, % | | 33.1 | 33.7 | 29.2 |
| D1: | $ClO_2$, % | 1 | 1 | 1.3 |
| | Residual, g/l | 0.003 | 0.006 | 0.006 |
| | End pH | 3.61 | 3.73 | 2.95 |
| | Brightness, % | 51.25 | 53.7 | 44.75 |
| E1: | End pH | 11.87 | 11.87 | 11.84 |
| | Brightness, % | 60.2 | 62.2 | 57.74 |
| D2: | $ClO_2$, % | 0.5 | 0.5 | 0.5 |
| | Residual, g/l | 0.006 | 0.006 | 0.067 |
| | End pH | 4.21 | 4.22 | 3.93 |
| | Brightness, % | 83.7 | 84.8 | 83.27 |
| E2: | End pH | 11.72 | 11.74 | 11.8 |
| | Brightness, % | 83.8 | 84.46 | 82.63 |
| D3: | $ClO_2$, % | 0.2 | 0.2 | 0.2 |
| | Residual, g/l | 0.036 | 0.03 | 0.07 |
| | End pH | 4.42 | 4.32 | 5.17 |
| | Brightness, % | 89.9 | 90.7 | 90.53 |

TABLE 32

Hardwood (Aspen)-DEopD Bleaching

| I. Conditions | Stage | D1 | *Eop | D2 |
|---|---|---|---|---|
| | Time, min | 90 | 50@80-90° C. | 90 |
| | Temp., ° C. | 70 | 90 | 70 |
| | Cons., % | 10 | 10 | 10 |

| II. Results | | 2016(0.1%) | 2066(0.2%) | Control |
|---|---|---|---|---|
| Initial Kappa No. | | 18.1 | 18.57 | 24.5 |
| Initial Brightness, % | | 33.1 | 33.7 | 28.3 |
| **D1: | $ClO_2$, % | 1 | 1 | 1 |
| | Residual, g/l | 0.003 | 0.006 | 0.003 |
| | End pH | 3.61 | 3.73 | 3.72 |
| | Brightness, % | 51.25 | 53.7 | 38.4 |

TABLE 32-continued

Hardwood (Aspen)-DEopD Bleaching

| | | | | |
|---|---|---|---|---|
| Eop: | NaOH, % | 3 | 3 | 3 |
| | $O_2$ pressure, psi | 30 | 30 | 30 |
| | $H_2O_2$, % | 0.5 | 0.5 | 0.5 |
| | Residual, g/l | 0.122 | 0.18 | 0.046 |
| | Kappa no. | — | — | 5.6 |
| | End pH | 11.69 | 11.66 | 11.75 |
| | Brightness, % | 78.8 | 79.15 | 71.22 |
| D2: | $ClO_2$, % | 0.3 | 0.3 | 0.3 |
| | Residual, g/l | 0.006 | 0.009 | 0.006 |
| | End pH | 4.21 | 4.12 | 4.2 |
| | Brightness, % | 88.5 | 88.7 | 84.6 |

Note:
*$MgSO_4$-0.1%
**pH adjusted with NaOH of 0.3% per % $ClO_2$

Example 30

Kraft cooks were performed on undried hardwood (aspen) wood chips according to the procedure described in the Pulping Description section of the Examples using either Dequest 2016 at 0.1 wt. % concentration or using Dequest 2066 at 0.2 wt. % concentration. The pulp was recovered and tested and the results presented in Table 33. The pulp was then bleached using a DEopP sequence (pH adjusted) as described in the Bleaching Description section of the Examples using the conditions set forth in Table 33. The bleached pulps were tested during and at the end of the bleaching sequence and the results presented in Table 33.

The data in Table 33 demonstrates that Dequest 2016 and 2066 produced pulps with higher initial brightness and lower Kappa number. Dequest 2016 and 2066 also produced bleached pulp with significantly higher brightness after each stage. It is significant that the final brightness of the invention is 5.2–6.15% higher than the control.

Example 31

Kraft cooks were performed on undried hardwood (aspen) wood chips according to the procedure described in the Pulping Description section of the Examples using either no added compound of the invention (control) or compound 4NHMP, DTPA, Blend 83A, and Blend 84 at 0.2 wt. % concentration or Blend 86 at 0.1 wt. % concentration. The pulp was recovered and tested and the results presented in Table 34. The pulp was then bleached using a DEDED sequence (pH adjusted) as described in the Bleaching Description section of the Examples using the conditions set forth in Table 34. The bleached pulps were tested during and at the end of the bleaching sequence and the results presented in Table 34.

The data in Table 34 demonstrates that compounds of the invention tested produced pulps with higher initial brightness and lower kappa number. The compounds of the invention tested also produced bleached pulp with higher brightness after the D1, E1, D2, E2 and D3 stages. The improvement in final brightness is significant. The data in Table 34 further demonstrates that the most significant improvement in final brightness is achieved with compound 4NHMP or the blend of compound 4NHMP and Dequest 2016 (Blend 83A).

TABLE 33

| Hardwood (Aspen)-DEopP Bleaching | | | | |
|---|---|---|---|---|
| I. Conditions | Stage | D | *Eop | **P |
| | Time, min | 90 | 50@80-90° C. | 120 |
| | Temp., ° C. | 70 | 90 | 85-87 |
| | Cons., % | 10 | 10 | 10 |
| II. Results | | 2016(0.1%) | 2066(0.2%) | Control |
| Initial Kappa No. | | 18.1 | 18.57 | 24.5 |
| Initial Brightness, % | | 33.1 | 33.7 | 28.3 |
| ***D: | $ClO_2$, % | 1 | 1 | 1 |
| | Residual, g/l | 0.003 | 0.006 | 0.003 |
| | End pH | 3.61 | 3.73 | 3.72 |
| | Brightness, % | 51.25 | 53.7 | 38.4 |

TABLE 33-continued

| Hardwood (Aspen)-DEopP Bleaching | | | | |
|---|---|---|---|---|
| Eop: | NaOH, % | 3 | 3 | 3 |
| | $O_2$ pressure, psi | 30 | 30 | 30 |
| | $H_2O_2$, % | 0.5 | 0.5 | 0.5 |
| | Residual, g/l | 0.122 | 0.18 | 0.046 |
| | Kappa no. | — | — | 5.6 |
| | End pH | 11.69 | 11.66 | 11.75 |
| | Brightness, % | 78.8 | 79.15 | 71.22 |
| P: | $H_2O_2$, % | 0.6 | 0.6 | 0.6 |
| | Residual, g/l | 0.08 | 0.24 | 0.007 |
| | End pH | 11.67 | 11.62 | 11.66 |
| | Brightness, % | 84.7 | 85.65 | 79.5 |

Note:
*$MgSO_4$-0.1%
**$Na_2SiO_3$-1.5%, $MgSO_4$-0.1%, NaOH-2%
***pH adjusted with NaOH of 0.3% per % $ClO_2$

TABLE 34

| Hardwood (Aspen) DEDED Bleaching (pH adjusted) | | | | | | | |
|---|---|---|---|---|---|---|---|
| I. Conditions: | Stage | D1 | E1 | D2 | D2 | E2 | D3 |
| | Time, min | 90 | 60 | 90 | 90 | 60 | 90 |
| | Temp., ° C. | | | 70 | 70 | | |
| | NaOH, % | 0.3%/% $ClO_2$ | 2 | 0.3%/% $ClO_2$ | 0.3%/% $ClO_2$ | 2 | 0 |
| | Consistency | | | 10 | | | |

| II. Results: | | Control | (0.2%) | DTPA (0.2%) | Blend 83A (0.2%) | Blend 84 (0.1%) | Blend 86 (0.2%) | 4NHMP |
|---|---|---|---|---|---|---|---|---|
| Cooking H-Factor: | | | 853 | 853 | 853 | 853 | 853 | 853 |
| Ini. Kappa no. | | | 23.87 | 19.2 | 15.3 | 16.7 | 18.8 | 16.35 |
| Ini. Brightness, % | | | 28.7 | 29.9 | 33.7 | 31.4 | 29.9 | 35.1 |
| D1: | $ClO_2$, % | | 1 | 1 | 1 | 1 | 1 | 1 |
| | Residual, g/l | | ~1.006 | ~1.006 | ~1.006 | ~1.006 | ~1.006 | 0.009 |
| | End pH | | 3.22 | 2.96 | 3.88 | 3.8 | 4.04 | 3.05 |
| | Brightness, % | | 41.5 | 47.55 | 56.2 | 52.9 | 49.2 | 53.7 |
| E1: | End pH | | 11.94 | 11.95 | 11.93 | 11.94 | 11.89 | 12.04 |
| | Brightness, % | | 54.3 | 58.5 | 64.28 | 61.8 | 59.7 | 64.8 |
| D2: | $ClO_2$, % | | 0.5 | 0.5 | 0.032 | 0.5 | 0.5 | 0.5 |
| | Residual, g/l | | 0.0096 | 0.019 | 0.019 | 0.032 | 0.0096 | 0.016 |
| | End pH | | 4.21 | — | 4.57 | 4.62 | 4.49 | 4.11 |
| | Brightness, % | | 79.5 | 82.5 | 86.3 | 84.6 | 84.1 | 86.2 |
| E2: | End pH | | 11.94 | 11.97 | 11.98 | 11.94 | 11.89 | 12.13 |
| | Brightness, % | | 79.8 | 82.1 | 85.3 | 84.1 | 83.4 | 85.5 |
| D3: | $ClO_2$, % | | 0.2 | 0.2 | 0.2 | 0.2 | 0.2 | 0.2 |
| | Residual, g/l | | 0.013 | 0.022 | 0.032 | 0.026 | 0.026 | 0.026 |
| | End pH | | 4.4 | 4.4 | 3.98 | 4.42 | 4.15 | 4.31 |
| | Brightness, % | | 88.72 | 90 | 91.9 | 90.5 | 90.3 | 91.5 |

Example 32

Multiple Kraft cooks were performed in a custom-made laboratory-scale multiple digester equipment and the results presented in Table 35. The digester equipment consisted of seven Parr bomb reactors (approx. 1 L) in a carousel that were rotated through a temperature-controlled oil bath. Aspen wood chips and white liquor used in the Kraft cooks were obtained from a commercial pulp mill located in the Upper Midwestern United States. The wood chips used were hand picked to reduce variability. Pulping conditions were: liquor:wood weight ratio of 4:1, 16% active alkali and 26.7% sulfidity. The digester temperature was ramped from ambient temperature to 170° C. in approximately 72 minutes. The H-factor was varied in the cooks conducted.

Yield was determined as follows. Pulps were completely transferred from the Parr bomb reactors to individual containers. The pulps were disintegrated for one minute and filtered to remove liquid, followed by air drying in a ventilated hood in aluminum trays overnight. Total yield of solids from the above air-dried pulps was determined by the formula: Total Yield=(total solid weight of air-dried pulp recovered*100)/(weight of OD wood chip used).

Reject was determined as follows. Pulps were screened using a vibrating screener with a 200 mesh screen, and the total material retained on the screen was weighed after drying in an oven overnight. Reject % was determined by the formula:

Reject %=(weight OD retained material*100)/(weight of OD wood chip used).

The data in Table 35 demonstrate that the use of Dequest 2016 and Dequest 2066 in the Kraft cooks resulted in increased yields compared to the control without phosphonate.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

TABLE 35

Aspen Kraft Cook Experiments Using Commercial Mill White Liquor

| | H-Factor | Kappa number | % Total Yield | % Reject |
|---|---|---|---|---|
| Control: | 600 | 14.09 | 58.4 | 1.25 |
| | 800 | 12.92 | 54.05 | 0.2 |
| | 1000 | 11.77 | 54.05 | 0.003 |
| | 1200 | 11.58 | 55.17 | 0.001 |
| 2016 (0.2 wt. %) | 600 | 16.1 | 59.73 | 0.53 |
| | 800 | 13.44 | 58.57 | 0.28 |
| | 1000 | 11.94 | 56.83 | 2.07 |
| | 1200 | 12.68 | 56.43 | 1.25 |
| 2066 (0.2 wt. %) | 600 | 16.15 | 57.33 | 0.8 |
| | 800 | 13.64 | 57.44 | 0.06 |
| | 1000 | 12.83 | 56.53 | 0.48 |
| | 1200 | 12.92 | 56.55 | 0.25 |
| Repeated Trials: | | | | |
| Control: | 600 | 15.12 | 56.74 | — |
| | 800 | 12.4 | 54 | — |
| | 1000 | 11.4 | 54.24 | — |
| | 1200 | 11.73 | 56.46 | — |
| 2016 (0.2 wt. %) | 800 | 12.42 | 55.2 | — |
| | 1000 | 11.78 | 56.86 | — |

What is claimed is:

1. An aqueous composition for improving properties of pulp produced, reducing the digester cycle time, or reducing the pulping or bleaching chemicals required in alkaline chemical pulping processes said composition comprising the alkaline composition of the digester of said process and at least one compound selected from the group consisting of phosphonates having the formula:

$$X_2NCH_2PO_3M_2 \quad (I)$$

in an amount, on an active acid basis, of from about 0.5% to about 1% based upon the dry weight of the wood chips in said digester, (II) phosphonates having the formula:

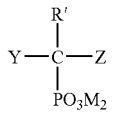

(II)

in an amount, on an active acid basis, of from about 0.3% to about 1% based upon the dry weight of the wood chips in said digester,

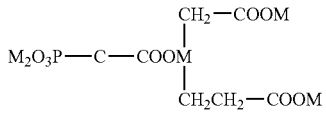

(IV)

in an amount, on an active acid basis, of from about [0.5%] *0.05%* to about 1% based upon the dry weight of the wood chips in said digester, and, on an active acid basis, from about 0.03% to about 1% of amine oxides of the phosphonates of formula (I), based upon the dry weight of wood chips in said digester, or mixtures thereof; wherein M is independently selected from hydrogen, alkali metal, alkaline earth metal or ammonium, X is independently selected from H, R, —$CH_2PO_3M_2$ wherein R is an alkyl group or —$NX_2$ substituted alkyl group having 2 to 6 carbon atoms, R' is an alkyl group having 1 to 17 carbon atoms and R' is optionally branched, optionally unsaturated, and optionally substituted with $SO_3M$, Y is selected from —$PO_3M_2$, H or R', and Z is selected from —OH or —$NR_1R_2$ wherein $R_1$ and $R_2$ are independently selected from hydrogen or alkyl having 1 to 2 carbon atoms.

2. The composition of claim 1 wherein M is independently selected from hydrogen or an alkali metal.

3. The composition of claim 2 wherein M is sodium or potassium when M is an alkali metal.

4. The composition of claim 1 wherein X is independently selected from —$CH_2PO_3M_2$ or R.

5. The composition of claim 4 wherein at least one of X is R and R is —$(CH_2)_nNX'_2$, wherein n is an integer from 2 to 6 and X' is independently selected from R or —$CH_2PO_3M_2$.

6. The composition of claim 4 wherein each X is R and R is —$(CH_2)_nNX'_2$, wherein n is an integer from 2 to 6 and X' is independently selected from R or —$CH_2PO_3M_2$.

7. The composition of claim 1 wherein Y is —$PO_3M_2$.

8. The composition of claim 7 wherein Z is —OH.

9. The composition of claim 7 wherein R' is an alkyl group having 1 to 11 carbon atoms.

10. The composition of claim 7 wherein R' is substituted with —$SO_3M$.

11. The composition of claim 7 wherein Z is —$NR_1R_2$.

12. The composition of claim 1 wherein R' is an alkyl group having 1 to 11 carbon atoms.

13. The composition of claim 12 wherein R' is an alkyl group having 1 to 5 carbon atoms.

14. The composition of claim 1 wherein said compound is at least one phosphonate of formula (I).

15. The composition of claim 14 wherein said phosphonate is $(M_2O_3PCH_2)_2NCH_2CH_2N(CH_2PO_3M_2)_2$ and the amount of said phosphonate on an active acid basis is about 0.03 to about 1 wt. % based on the weight of wood chips charged to said digester.

16. The composition of claim 14 wherein said phosphonate is $(M_2O_3PCH_2)_2N(CH_2)_6N(CH_2PO_3M_2)_2$ and the amount of said phosphonate on an active acid basis is about 0.03 to about 1 wt. % based on the weight of wood chips charged to said digester.

17. The composition of claim 14 wherein said phosphonate is $(M_2O_3PCH_2)_2NCH_2CH_2N(CH_2PO_3M_2)CH_2CH_2N(CH_2PO_3M_2)_2$ and the amount of said phosphonate on an active acid basis is about 0.03 to about 1 wt. % based on the weight of wood chips charged to said digester.

18. The composition of claim 14 wherein said phosphonate is $(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$ and the amount of said phosphonate on an active acid basis is about 0.03 to about 1 wt. % based on the weight of wood chips charged to said digester.

19. The composition of claim 1 wherein said compound is at least one phosphonate of formula (II).

20. The composition of claim 19 wherein said phosphonate is $CH_3C(OH)(PO_3M_2)_2$ and the amount of said phosphonate on an active acid basis is about 0.03 to about 1 wt. % based on the weight of wood chips charged to said digester.

21. The composition of claim 1 wherein said compound is at least one compound of formula (IV).

22. The composition of claim 1 wherein said compound is a mixture of at least two phosphonates of formula (I).

23. The composition of claim 22 wherein said phosphonate is a mixture of:

$(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$, and a second phosphonate selected from $N(CH_2PO_3M_2)_3$, $(M_2O_3PCH_2)_2NCH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)CH_2CH_2N(CH_2PO_3M_2)_2$.

24. The composition of claim 23 wherein said second phosphonate is $N(CH_2PO_3M_2)_3$, and the amount of said mixture on an active acid basis is about 0.03 to about 1 wt. % based on the weight of wood chips charged to said digester.

25. The composition of claim 23 wherein said second phosphonate is selected from $(M_2O_3PCH_2)_2NCH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)CH_2CH_2N(CH_2PO_3M_2)_2$, and the amount of said mixture on an active acid basis is about 0.03 to about 1 wt. % based on the weight of wood chips charged to said digester.

26. The composition of claim 22 wherein said phosphonate is a mixture of $(M_2O_3PCH_2)_2N(CH_2)_6N(CH_2PO_3M_2)_2$ and a second phosphonate selected from $(M_2O_3PCH_2)_2NCH_2CH_2N(CH_2PO_3M_2)CH_2CH_2N(CH_2PO_3M_2)_2$ or $N(CH_2PO_3M_2)_3$, and the amount of said mixture on an active acid basis is about 0.03 to about 1 wt. % based on the weight of wood chips charged to said digester.

27. The composition of claim 22 wherein said phosphonate is a mixture of $(M_2O_3PCH_2)_2NCH_2CH_2N(CH_2PO_3M_2)CH_2CH_2N(CH_2PO_3M_2)_2$ and $N(CH_2PO_3M_2)_3$, and the amount of said mixture on an active acid basis is about 0.03 to about 1 wt. % based on the weight of wood chips charged to said digester.

28. The composition of claim 22 wherein said phosphonate is a mixture of $(M_2O_3PCH_2)_2NCH_2CH_2N(CH_2PO_3M_2)_2$ and a second phosphonate selected from $(M_2O_3PCH_2)_2N(CH_2)_6N(CH_2PO_3M_2)_2$, $(M_2O_3PCH_2)_2NCH_2CH_2N(CH_2PO_3M_2)CH_2CH_2N(CH_2PO_3M_2)_2$, or $N(CH_2PO_3M_2)_3$, and the amount of said mixture on an active acid basis is about 0.03 to about 1 wt. % based on the weight of wood chips charged to said digester.

29. The composition of claim 1 wherein said compound is a mixture of at least one phosphonate of formula (I) and at least one phosphonate of formula (II).

30. The composition of claim 29 wherein said phosphonate is a mixture of a first phosphonate selected from $N(CH_2PO_3M_2)_3$, $(M_2O_3PCH_2)_2NCH_2CH_2N(CH_2PO_3M_2)CH_2CH_2N(CH_2PO_3M_2)_2$, $(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$, $(M_2O_3PCH_2)_2N(CH_2)_6N(CH_2PO_3M_2)_2$, or $(M_2O_3PCH_2)_2NCH_2CH_2N(CH_2PO_3M_2)_2$, and a second phosphonate selected from $CH_3C(OH)(PO_3M_2)_2$.

31. The composition of claim 30 wherein where said first phosphonate is selected from $(M_2O_3PCH_2)_2N(CH_2)_6N(CH_2PO_3M_2)_2$, $(M_2O_3PCH_2)_2NCH_2CH_2CH_2N(CH_2PO_3M_2)CH_2CH_2N(CH_2PO_3M_2)CH_2CH_2CH_2N(CH_2PO_3M_2)_2$, $(M_2O_3PCH_2)_2NCH_2CH_2N(CH_2PO_3M_2)CH_2CH_2N(CH_2PO_3M_2)_2$, or $(M_2O_3PCH_2)_2NCH_2CH_2N(CH_2PO_3M_2)_2$, and the amount of said mixture on an active acid basis is about 0.03 to about 1 wt. % based on the weight of wood chips charged to said digester.

32. The composition of claim 30 wherein said first phosphonate is $N(CH_2PO_3M_2)_3$ and the amount of said mixture on an active acid basis is about 0.03 to about 1 wt. % based on the weight of wood chips charged to said digester.

33. The composition of claim 1 wherein said compound is a mixture of at least two phosphonates of formula (II).

34. The composition of claim 1 wherein said compound is a mixture of at least one compound of formula (IV) with at least one compound selected from the phosphonates of formula (I) or formula (II).

35. The composition of claim 1 wherein said compound is an amine oxide of the phosphonates of formula (I).

36. The composition of claim 35 wherein said amine oxide is $^{-}O \leftarrow {}^{+}N—(CH_2PO_3M_2)_3$.

37. The composition of claim 1 wherein the pH of said alkaline aqueous mixture is at least 9.

38. The composition of claim 37 wherein the pH of said alkaline aqueous mixture is about 12 to 14.

39. The composition of claim 1 further comprising anthroquinone.

40. An aqueous composition for improving properties of pulp produced in alkaline chemical pulping processes, said composition comprising the alkaline composition of the digester of said process and at least one compound selected from the group consisting of phosphonates having the formula:

$$X_2NCH_2PO_3M_2 \quad \text{(I)}$$

in an amount, on an active acid basis, of from about 0.1% to about 0.5% based upon the dry weight of the wood chips in said digester, (II)

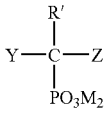

in an amount, on an active acid basis, of from about 0.05% to about 0.5% based upon the dry weight of the wood chips in said digester, (IV)

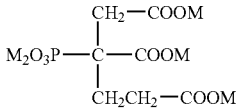

in an amount, on an active acid basis, of from about [0.01%] *0.05*% to about 0.5% based upon the dry weight of the wood chips in said digester, and, on an active acid basis, from about 0.03% to about 1% of amine oxides of the phosphonates of formula (I), based upon the dry weight of wood chips in said digester, or mixtures thereof;

wherein M is independently selected from hydrogen, alkali metal, alkaline earth metal or ammonium, X is independently selected from H, R, —$CH_2PO_3M_2$ wherein R is an alkyl group or —$NX_2$ substituted alkyl group having 2 to 6 carbon atoms, R' is an alkyl group having 1 to 17 carbon atoms and R' is optionally branched, optionally unsaturated, and optionally substituted with $SO_3M$, Y is selected from —$PO_3M_2$, H or R', and Z is selected from —OH or —$NR_1R_2$ wherein $R_1$ and $R_2$ are independently selected from hydrogen or alkyl having 1 to 2 carbon atoms.

* * * * *